US012774967B2

(12) United States Patent
Rocher

(10) Patent No.: US 12,774,967 B2
(45) Date of Patent: Oct. 27, 2026

(54) SYSTEM AND METHOD FOR EVALUATING COMPONENTS USING COMPUTED TOMOGRAPHY AND THERMOGRAPHY

(71) Applicant: PRATT & WHITNEY CANADA CORP., Longueuil (CA)

(72) Inventor: Guy Joel Rocher, Mont-Royal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 88 days.

(21) Appl. No.: 18/963,872

(22) Filed: Nov. 29, 2024

(65) Prior Publication Data

US 2026/0153453 A1 Jun. 4, 2026

(51) Int. Cl.

| | |
|---|---|
| ***G01N 23/046*** | (2018.01) |
| ***G01N 23/083*** | (2018.01) |
| ***G01N 23/18*** | (2018.01) |
| ***G01N 25/72*** | (2006.01) |

(52) U.S. Cl.

CPC ......... *G01N 23/046* (2013.01); *G01N 23/083* (2013.01); *G01N 23/18* (2013.01); *G01N 25/72* (2013.01)

(58) Field of Classification Search

CPC .... G01N 23/046; G01N 23/083; G01N 23/18; G01N 25/72

See application file for complete search history.

(56) References Cited

U.S. PATENT DOCUMENTS 6,690,016 B1 * 2/2004 Watkins ................ G01N 25/72 250/341.7

11,047,819 B2 6/2021 Martin et al.

11,275,037 B2 3/2022 Zhou et al.

2002/0172410 A1 * 11/2002 Shepard .................... G06T 7/40 382/141

2004/0218715 A1 * 11/2004 Jones ................ G01N 33/2045 378/57

(Continued)

FOREIGN PATENT DOCUMENTS

| | | | |
|---|---|---|---|
| CN | 119000737 | A | 11/2024 |
| DE | 102007032064 | A1 | 1/2009 |

OTHER PUBLICATIONS

Jaeger Benedict E. Et Al: "Infrared Thermal Imaging-Based Turbine Blade Crack Classification Using Deep Learning", Journal of Non-destructive Evaluation., vol. 41, No. 4, Oct. 19, 2022.

(Continued)

*Primary Examiner* — Blake C Riddick

(74) *Attorney, Agent, or Firm* — Norton Rose Fulbright Canada LLP

(57) ABSTRACT

Systems and methods for non-destructive evaluation of components using computed tomography and infrared thermography are provided. A method includes acquiring, using X-ray computed tomography, a digital three-dimensional representation of the component, and identifying a region of the component containing the defect from the digital three-dimensional representation of the component. The component is mechanically excited to induce a thermal response in the region of the component containing the defect. A thermographic image of the region of the component containing the defect is acquired with an infrared sensor while the thermal response is exhibited. The component is evaluated using the thermographic image.

20 Claims, 14 Drawing Sheets

(56) References Cited

U.S. PATENT DOCUMENTS

| | | | | |
|---|---|---|---|---|
| 2005/0008215 | A1* | 1/2005 | Shepard | G01N 25/72 382/141 |
| 2005/0225754 | A1* | 10/2005 | Ume | G01N 21/95607 356/237.1 |
| 2008/0137105 | A1* | 6/2008 | Howard | G01N 29/2418 356/630 |
| 2008/0291465 | A1* | 11/2008 | Lorraine | G01N 25/72 73/632 |
| 2013/0340562 | A1* | 12/2013 | Mitsumura | G01N 29/07 420/528 |
| 2019/0265178 | A1* | 8/2019 | Martin | G01N 29/069 |
| 2020/0075431 | A1* | 3/2020 | Jacobs | H10P 74/203 |
| 2020/0182808 | A1* | 6/2020 | Zhou | G01N 23/046 |
| 2021/0302377 | A1* | 9/2021 | Jack | G01N 29/11 |
| 2021/0302379 | A1* | 9/2021 | Jack | G01N 29/265 |
| 2021/0357555 | A1 | 11/2021 | Liu et al. | |
| 2023/0281790 | A1 | 9/2023 | Dixon et al. | |
| 2024/0044845 | A1* | 2/2024 | Fleck | G01N 29/28 |

OTHER PUBLICATIONS

European Patent Office, Communication re: extended European search report mailed Apr. 24, 2026 re: European Patent Application No. 25219880.9.

* cited by examiner

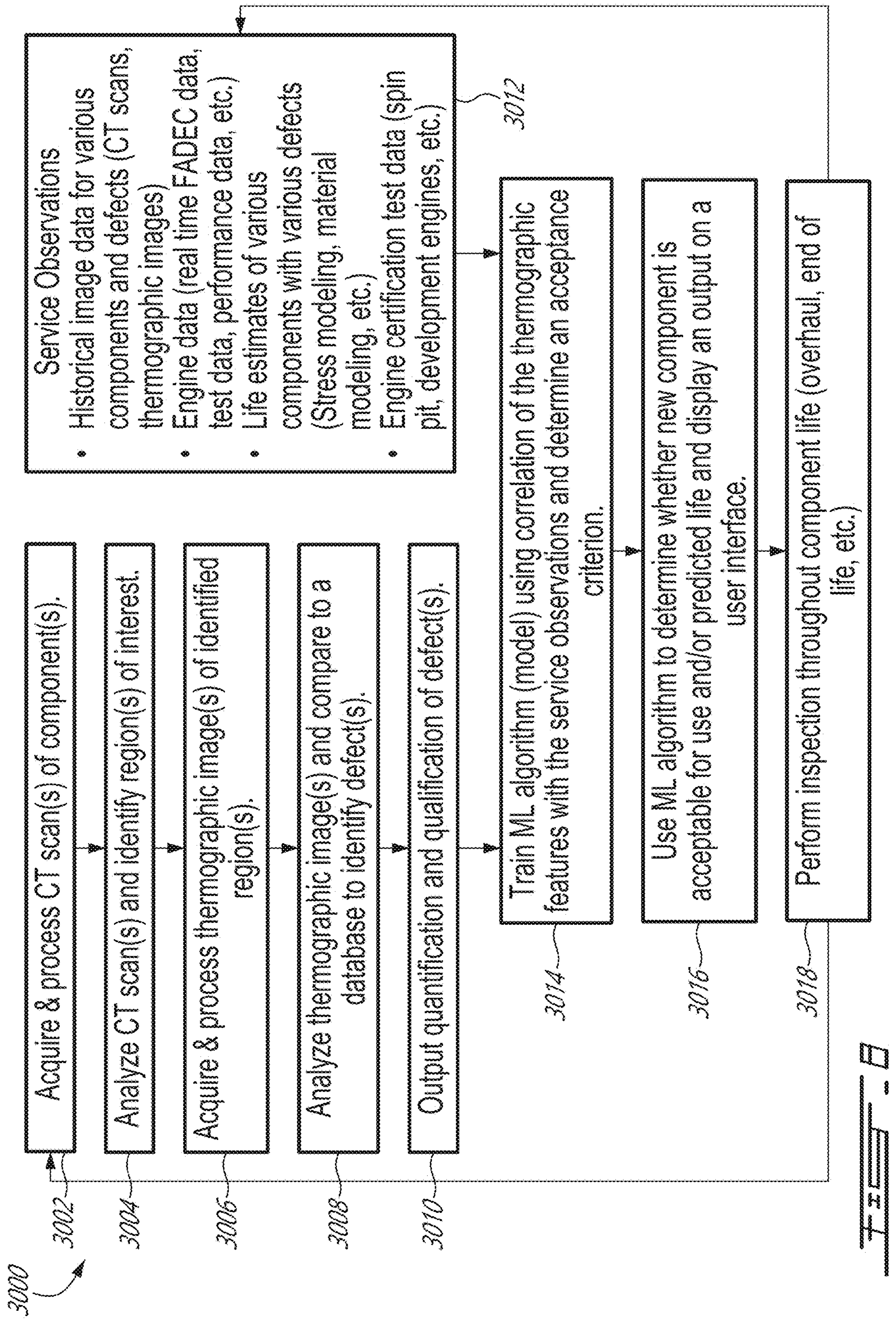
3000
Acquire & process CT scan(s) of component(s).
3002
Analyze CT scan(s) and identify region(s) of interest.
3004
Acquire & process thermographic image(s) of identified region(s).
3006
Analyze thermographic image(s) and compare to a database to identify defect(s).
3008
Output quantification and qualification of defect(s).
3010
Service Observations
• Historical image data for various components and defects (CT scans, thermographic images)
• Engine data (real time FADEC data, test data, performance data, etc.)
• Life estimates of various components with various defects (Stress modeling, material modeling, etc.)
• Engine certification test data (spin pit, development engines, etc.)
3012
Train ML algorithm (model) using correlation of the thermographic features with the service observations and determine an acceptance criterion.
3014
Use ML algorithm to determine whether new component is acceptable for use and/or predicted life and display an output on a user interface.
3016
Perform inspection throughout component life (overhaul, end of life, etc.)
3018

86

| | Input 78 | Output(s) | | 80 |
|---|---|---|---|---|
| Sample Number | Thermographic Image | Remaining Service Life (% of nominal) | Defect Characteristic(s) | Service Category |
| 1 | 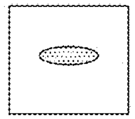 | 88% | Type: crack<br>Size: small<br>Orientation: transverse to blade axis | Acceptable |
| 2 | 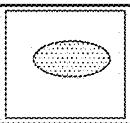 | 42% | Type: void<br>Size: medium | Needs Rework |
| 3 | 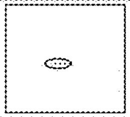 | 97% | Type: void<br>Size: small | Acceptable |
| 4 | 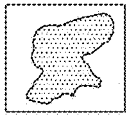 | nil | Type: porosity<br>Severity: high | Rejected |
| 5 | 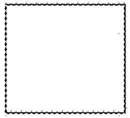 | 100% | n/a | Acceptable |
| ... | ... | ... | ... | ... |

↓

70B — ML Algorithm

FIG. 11

SYSTEM AND METHOD FOR EVALUATING COMPONENTS USING COMPUTED TOMOGRAPHY AND THERMOGRAPHY

TECHNICAL FIELD

The disclosure relates generally to non-destructive testing, and more particularly to evaluating components using computed tomography and infrared thermography.

BACKGROUND

Some components of aircraft power plants are subjected to cyclic loading during use. Internal defects such as cracks and/or voids in a component can affect the service life of the component. Existing non-destructive testing methods can provide insight on the structural integrity of a component but do not elaborate of on the future performance of the component. Improvement is desirable.

SUMMARY

In one aspect, the disclosure describes a method of evaluating a component containing a defect using non-destructive inspection. The method comprises:

- acquiring, using X-ray computed tomography, a digital three-dimensional representation of the component;
- identifying a region of the component containing the defect from the digital three-dimensional representation of the component;
- mechanically exciting the component to induce a thermal response in the region of the component containing the defect;
- acquiring, with an infrared sensor while the thermal response is exhibited, a thermographic image of the region of the component containing the defect; and
- evaluating the component using the thermographic image.

Evaluating the component may include: executing a machine learning algorithm to process the thermographic image and determine a remaining service life of the component based on the thermographic image; and generating an output indicative of the remaining service life of the component. The machine learning algorithm may have been trained using machine learning on historical data associating previous thermographic images with previous remaining service lives.

The remaining service life of the component may be a first remaining service life of the component. Evaluating the component may include identifying a characteristic of the defect in the component based on the thermographic image. The method may include, before generating the output indicative of the first remaining service life: determining a second remaining service life of the component using the characteristic of the defect and a digital twin of the component; and validating the first remaining service life by comparing the first remaining service life with the second remaining service life.

The machine learning algorithm may be a first machine learning algorithm. Identifying the region of the component containing the defect in the digital three-dimensional representation of the component may include: executing a second machine learning algorithm to process the digital three-dimensional representation of the component and identify the region of the component containing the defect; and generating an output indicative of the identified region of the component containing the defect. The machine learning algorithm may have been trained using machine learning on historical data identifying previous regions containing one or more defects in previous digital three-dimensional representations acquired using X-ray computed tomography.

Identifying a region of the component containing the defect in the digital three-dimensional representation of the component may include: executing a machine learning algorithm to process the digital three-dimensional representation of the component and identify the region of the component containing the defect; and generating an output indicative of the identified region of the component containing the defect. The machine learning algorithm may have been trained using machine learning on historical data identifying previous regions containing one or more defects in previous digital three-dimensional representations acquired using X-ray computed tomography.

Evaluating the component may include identifying a characteristic of the defect in the component based on the thermographic image.

Evaluating the component may include identifying a health condition for the component based on the thermographic image.

Mechanically exciting the component may include inducing frictional heating at the defect.

Acquiring the digital three-dimensional representation of the component and acquiring the thermographic image may be performed while the component remains in a same fixture.

Embodiments may include combinations of the above features.

In another aspect, the disclosure describes a method of determining a health condition of a component using X-ray computed tomography and infrared thermography. The method comprises:

- acquiring, using X-ray computed tomography, a three-dimensional scan of the component;
- executing a first machine learning algorithm to process the three-dimensional scan of the component to identify a region of the component containing a defect based on the three-dimensional scan;
- mechanically exciting the component to induce a thermal response in the region of the component containing the defect;
- acquiring a thermographic image of the region of the component containing the defect while the thermal response is exhibited;
- executing a second machine learning algorithm to process the thermographic image to determine the health condition of the component based on the thermographic image; and
- generating an output indicative of the health condition of the component.

The first machine learning algorithm may have been trained using machine learning on historical data identifying previous regions containing one or more defects in previous three-dimensional scans acquired using X-ray computed tomography.

The second machine learning algorithm may have been trained using machine learning on historical data associating previous thermographic images with previous health conditions.

Mechanically exciting the component may include acoustically exciting the component.

Acquiring the three-dimensional scan and acquiring the thermographic image may be performed while the component remains in a same fixture.

Embodiments may include combinations of the above features.

In a further aspect, the disclosure describes a system for performing non-destructive inspection of a component. The system comprises:

a fixture configured to hold the component;

an X-ray source and an X-ray detector cooperatively operable to perform X-ray computed tomography of the component while the component is held by the fixture;

a transducer operable to induce a vibration in the component and generate a thermal response in a region of the component containing a defect while the component is held by the fixture; and an infrared sensor operable to acquire a thermographic image of the region of the component containing the defect while the thermal response is exhibited.

The system may comprise one or more computers operable to process a three-dimensional scan of the component acquired by the X-ray computed tomography and identify the region of the component containing the defect from the three-dimensional scan.

The one or more computers may be operable to: execute a machine learning algorithm to process the three-dimensional scan of the component and identify the region of the component containing the defect; and generate an output indicative of the identified region of the component containing the defect. The machine learning algorithm may have been trained using machine learning on historical data identifying previous regions containing one or more defects in previous digital three-dimensional representations acquired using X-ray computed tomography.

The one or more computers may be operable to control a relative position between the infrared sensor and the component so that the thermographic image of the component acquired with the infrared sensor includes the region of the component containing the defect.

The one or more computers may be operable to process the thermographic image and determine a health condition of the component based on the thermographic image.

The fixture may be controllably movable relative to the X-ray source and relative to the infrared sensor.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 6 is a flow diagram of an exemplary method of evaluating a component containing a defect using non-destructive inspection;

FIG. 8 is a flow diagram of another exemplary method of evaluating a component using non-destructive inspection;

FIG. 11 shows a table containing other exemplary historical data used to train another machine learning algorithm using machine learning to associate previous thermographic images with previous health conditions of the component.

DETAILED DESCRIPTION

The present disclosure describes systems and methods for evaluating components of an aircraft power plant using industrial computed tomography (CT) and infrared thermography. In some embodiments, the methods and systems described herein may use CT scanning to identify one or more regions of interest (i.e., defective areas) in a component and then use infrared thermography to further evaluate the identified regions. Infrared thermography may include acquiring a thermographic image when an induced vibration (e.g., mechanical excitation) is applied to the component. A health condition (e.g., remaining service life, service category, defect characteristic) of the component may be determined based on the thermographic image. In some embodiments, the region of interest may be identified using a computer-implemented artificial intelligence algorithm (model) that is trained using machine learning (ML) and historical data identifying previous regions of interest in previous CT scans relevant to the component. In some embodiments, the health condition of the component may be estimated using a computer-implemented artificial intelligence algorithm (model) that is trained using machine learning (ML) and historical data associating previous thermographic images with previous health conditions relevant to the component.

In some embodiments, the methods and systems described herein may facilitate a non-destructive testing (NDT) method that also elaborates on a future performance of the component. The methods and systems described herein may be used on newly-manufactured components, newly-refurbished components and/or on in-service components to determine whether a component is suitable for service in the aircraft power plant. In some embodiments, the methods and systems described herein may improve the reliability of NDT, health monitoring and component life estimations. Aspects of various embodiments are described through reference to the drawings.

The term "connected" may include both direct connection and indirect connection. As used herein, the singular forms "a," "an," and "the" are intended to include the plural forms as well, unless the context clearly indicates otherwise.

Figure 1:
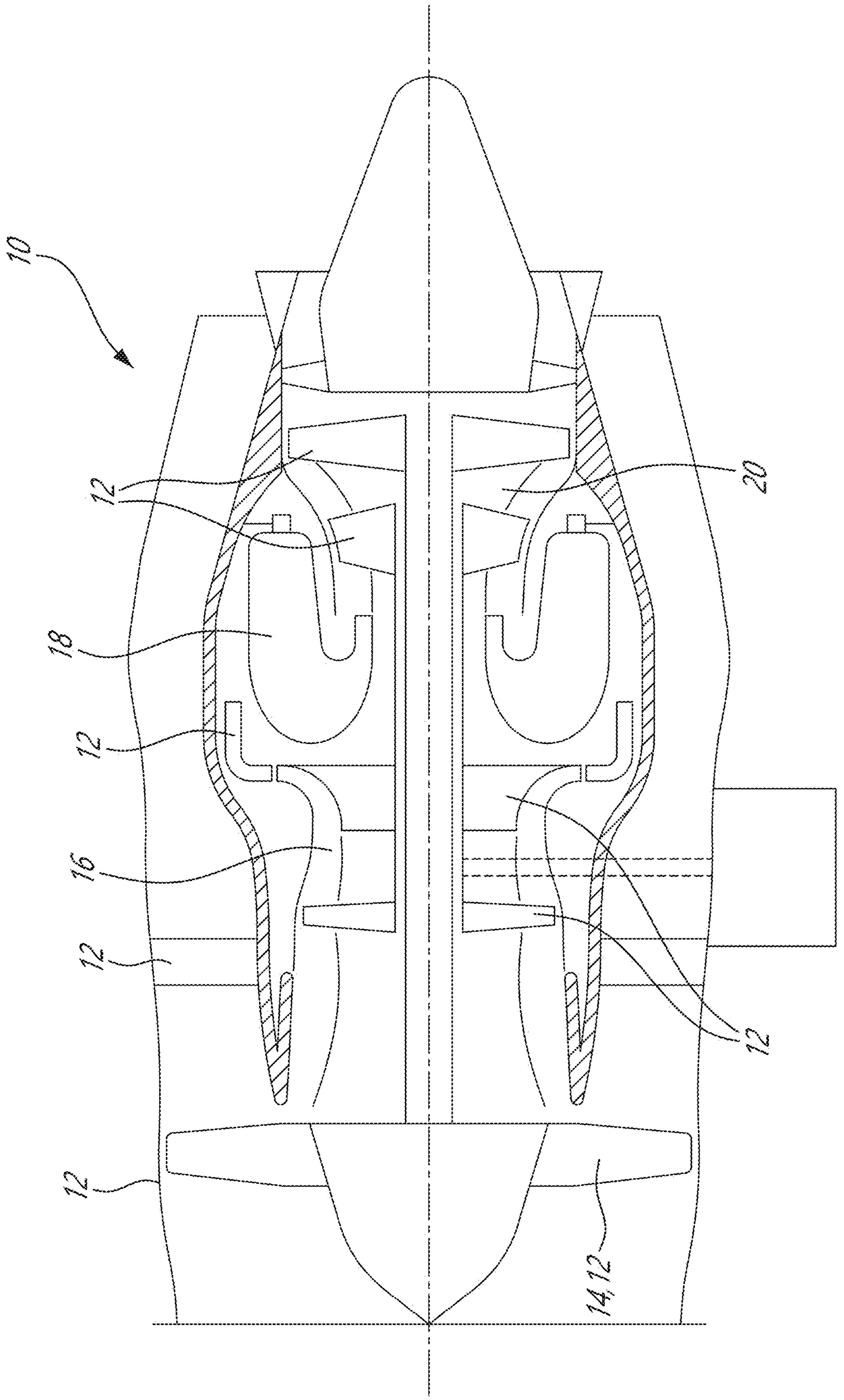
FIG-1 (PRIOR ART)
FIG. 1 shows a schematic axial cross-section view of a turbofan gas turbine engine as an exemplary aircraft power plant.

FIG. 1 illustrates an exemplary aircraft power plant 10 in the form of a turbofan gas turbine engine of a type preferably provided for use in subsonic flight. In various embodiments, power plant 10 may be configured to propel an aircraft to which power plant 10 is mounted, or power plant 10 may be an auxiliary power unit (APU) configured to perform non-propulsion functions onboard the aircraft. In some embodiments, power plant 10 may be or include a thermal engine such as gas turbine engine, a piston engine or a rotary (e.g., Wankel) engine. In some embodiments, power plant 10 may be a purely electric power plant. In some embodiments, power plant 10 may be a hybrid power plant including a thermal engine and an electric motor that cooperatively propel the aircraft. Power plant 10 may include one or more components 12 (referred hereinafter in the singular) that may be used with the methods and systems described herein in order to assess the health condition of such component(s) 12.

Power plant 10 as illustrated in FIG. 1 may generally include, in serial flow communication, fan 14 through which ambient air is propelled, multistage compressor 16 for pressurizing the air, combustor 18 in which the compressed air is mixed with fuel and ignited for generating an annular stream of hot combustion gases, and turbine section 20 for extracting energy from the combustion gases. In various embodiments, component 12 may include a rotor blade or a stator vane that is intended to be part of compressor 16, a rotor blade or a stator vane that is intended to be part of turbine section 20, a blade of fan 14, a bladed disc, or another relatively rigid component such as a duct (e.g., tube), a casing (shroud) surrounding fan 14, a structural brace such as a strut for example. In some embodiments, component 12 may be a single/sole part having a unitary (i.e., monolithic) construction.

In various embodiments, component 12 may be made from a metallic material, a polymer, a ceramic and/or a fiber-reinforced composite material including (e.g., carbon) fibers that are embedded in a polymeric matrix for example. Component 12 may be manufactured using one or more known or other manufacturing processes. In various embodiments, component 12 may be manufactured using one or more processes such as additive manufacturing (e.g., layer-by-layer 3D printing), (e.g., investment) casting, (e.g., metal, resin) injection moulding, forging, stamping, and/or subtractive manufacturing (e.g., machining, grinding, drilling) for example. In some embodiments, component 12 may be a cast metallic component.

In some situations, component 12 may include one or more (e.g., internal or surface) defects 22 (shown in FIG. 2A) that may affect the service life of component 12. For example, defect 22 may include a crack, a void, an inhomogeneity, corrosion, a disbond in a composite material, a delamination in a composite material, and/or a flaw resulting in broken fibers in fiber-reinforced materials. Defect 22 may include a (e.g., shrinkage) casting defect such as microporosity or microshrinkage (i.e., voids in the form of stringers shorter than shrinkage cracks), which can be difficult to detect and/or characterize with existing NDT methods such as x-ray CT due to the alignment of voids, grain diffraction, and potentially other factors. In some situations, additively manufactured components may exhibit an internal defect 22 due to structural complexities, material variability and potentially other factors.

Defect 22 may be generated during manufacturing and/or during service. The influence of defect 22 on the service life of component 12 may depend on the type, size and location of defect 22, and may also depend on the function of component 12 and the operating conditions of component 12 during the operation of power plant 10. For example, when component 12 is subjected to (e.g., mechanical and/or thermal) cyclic loading (e.g., low-cycle fatigue or high-cycle fatigue), the presence of internal and/or surface defect 22 may increase the risk of fatigue crack initiation and/or crack propagation within component 12 and affect the service life of component 12.

Some existing NDT methods may offer observations on the structural integrity of component 12 but do not elaborate on the future performance or service life of component 12. The methods and systems described herein may facilitate the determination of a health condition (e.g., remaining service life, service category) of component 12 using one or more computer-implemented artificial intelligence algorithms (models) trained using historical data and ML for example.

Figure 2A:
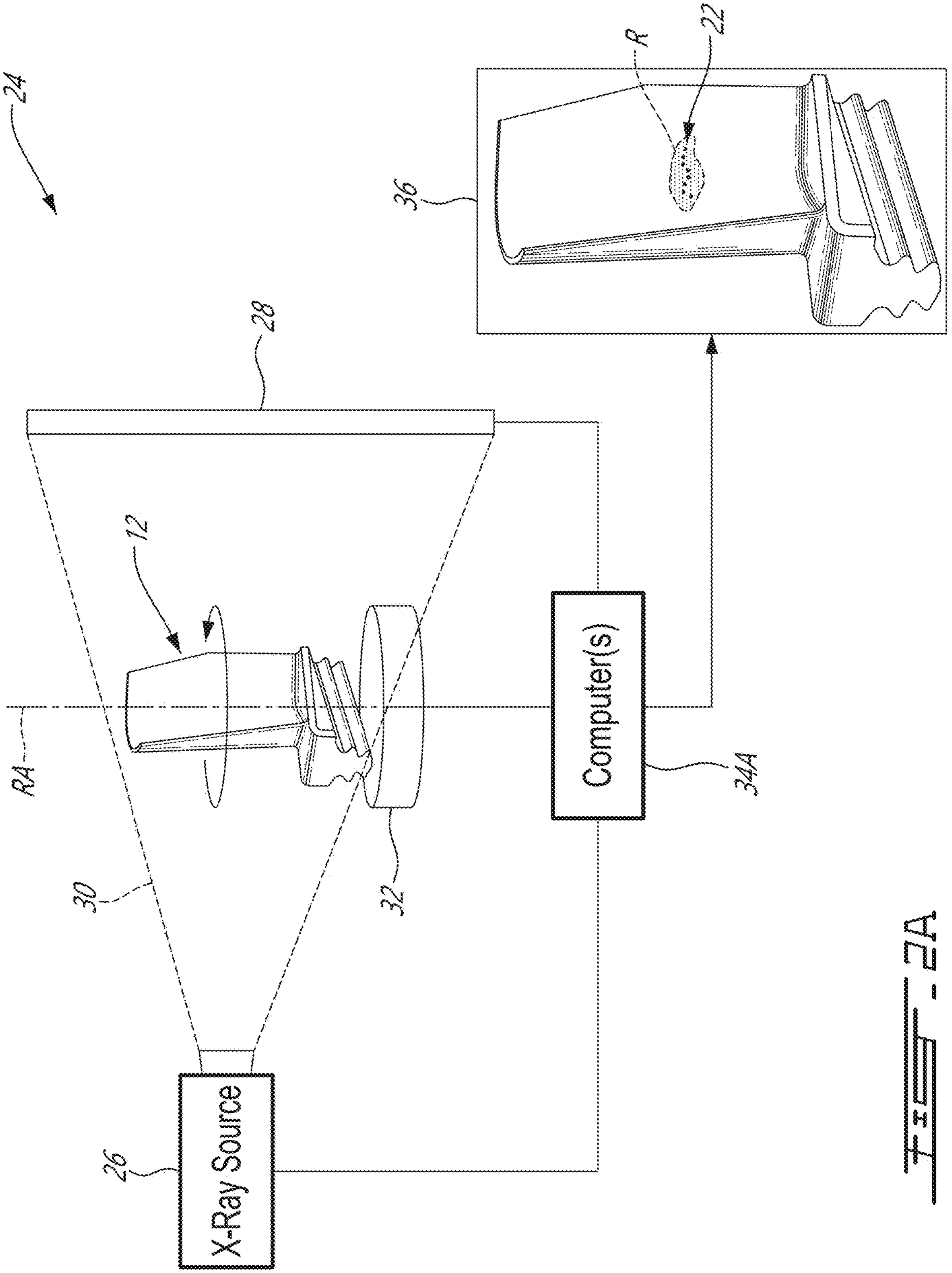
FIG. 2A is a schematic illustration of an exemplary industrial computed tomography system for evaluating a component of the aircraft power plant.

FIG. 2A is a schematic illustration of an exemplary industrial X-ray CT system 24 used during the evaluation of component 12 of aircraft power plant 10. CT system 24 may include one or more X-ray sources 26 (referred hereinafter in the singular), which may be a X-ray tube. CT system 24 may include one or more X-ray detectors 28 (referred hereinafter in the singular) positioned diametrically opposite to X-ray source 26 and that is configured to detect X-rays 30 that are emitted by X-ray source 26. In various embodiments, X-ray detector 28 may include scintillation (solid-state) detector(s) and ionization (xenon gas) detectors. In some embodiments, X-ray detector 28 may be a panel that includes an array of detectors.

X-ray source 26 may be aimed toward X-ray detector 28 so that X-rays 30 that are emitted by X-ray source 26 may be detected by X-ray detector 28. Component 12 may be disposed between X-ray source 26 and X-ray detector 28 so that component 12 may intersect X-rays 30 that are emitted by X-ray source 26. In some embodiments, X-ray source 26 and X-ray detector 28 may be motorized to rotate together around component 12 during inspection. Alternatively, X-ray source 26 and X-ray detector 28 may remain stationary during inspection while component 12 is rotated about rotation axis RA and intersecting the beam of X-rays 30 emitted by X-ray source 26.

CT system 24 may include fixture 32 (shown schematically) configured to hold component 12 during inspection. In some embodiments, fixture 32 may be a suitable clamp or chuck fixedly mounted to a numerically-controlled rotary table to permit controlled rotation of component 12 about rotation axis RA during inspection.

X-ray source 26 and X-ray detector 28 may be cooperatively operable to perform X-ray CT of component 12 while component 12 is held by fixture 32. X-ray CT may be a computerized X-ray imaging procedure in which the beam of X-rays 30 is aimed at component 12 while component 12 is rotated about rotation axis RA. The detection of X-rays 30 via X-ray detector 28 may be used to produce signals that are processed by one or more computers 34A (referred hereinafter in the singular) to generate cross-sectional images, or "slices" of component 12. These slices or tomographic images may together provide more detailed information than conventional X-ray scanning. Once a number of successive slices are collected by computer 34A, they can be digitally stacked together to form a digital three-dimensional (3D)

representation (i.e., image or scan) of component 12 to allow the identification of structure(s) that may be indicative of potential defects 22.

Computer 34A may be operatively connected to (e.g., in data communication with) one or more elements of CT system 24 to control an operation of CT system 24. For example, computer 34A may be operatively connected to X-ray source 26 to control an operation and/or movement of X-ray source 26. Computer 34A may be operatively connected to X-ray detector 28 to control an operation and/or movement of X-ray detector 28. In some embodiments, computer 34A may be operatively connected to fixture 32 via one or more actuators to control an operation (e.g., opening/closing) of fixture 32 and/or a movement of fixture 32 to cause a rotation of component 12 about rotation axis RA or other (e.g., linear and/or rotary) movement of component 12 relative to X-ray source 26 and X-ray detector 28.

Computer 34A may be configured to collect the tomographic images and digitally stack them together to define digital 3D CT scan 36 of a portion of component 12 or substantially an entirety of component 12. In some embodiments, computer 34A may be configured to process CT scan 36 of component 12 acquired by CT system 24 and identify region R of component 12 containing a potential defect.

In some situations, CT system 24 may provide a relatively rapid identification of region R that contains defect 22 but may not, on its own, provide a sufficiently detailed characterization of defect 22 for the purpose of evaluating a health condition of component 12. In other words, CT system 24 may provide a rapid but coarse evaluation of component 12 for the purpose of narrowing down one or more specific regions R that require further analysis. As explained below, the further (e.g., finer) analysis for the purpose of evaluating a health condition of component 12 may be performed using infrared thermography in region(s) R identified by CT system 24.

Figure 2B:
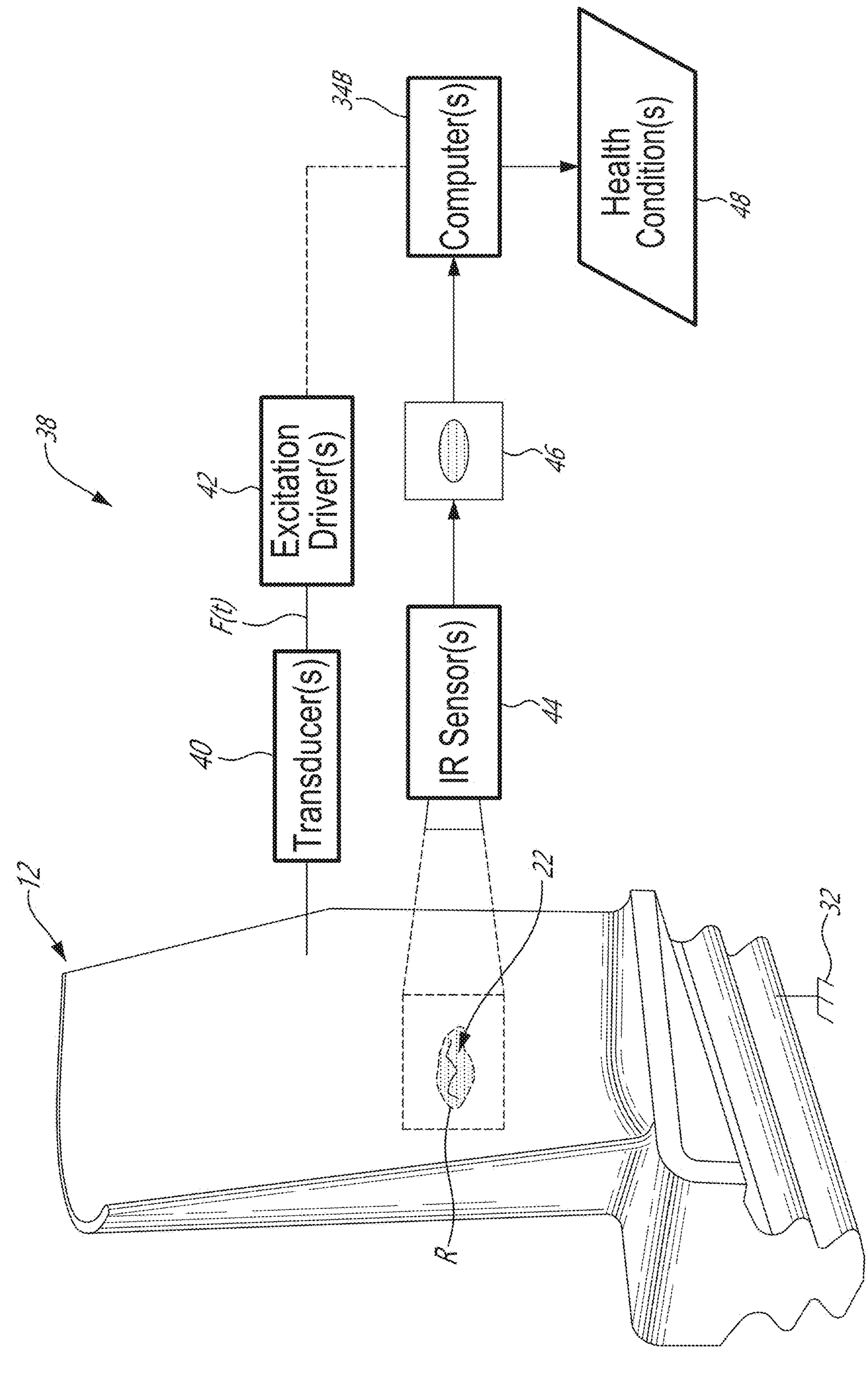
FIG. 2B is a schematic illustration of an exemplary infrared thermography system for evaluating the component of the aircraft power plant.
Figure 2E:
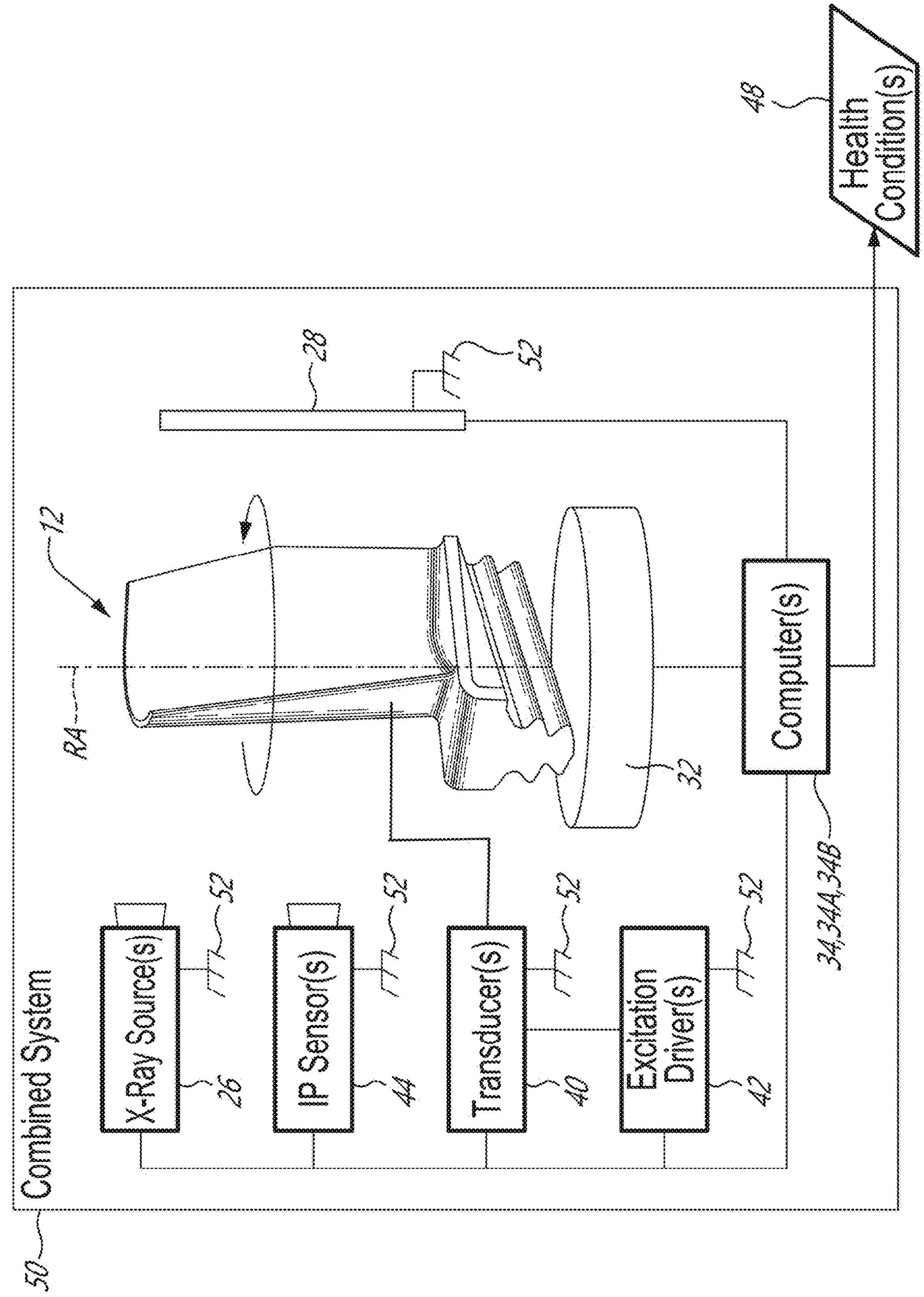
FIG. 2C is a schematic illustration of a combined inspection system combining computed tomography and infrared thermography functionalities.

FIG. 2B is a schematic illustration of an exemplary thermography system 38 for determining health condition 48 of component 12 using non-destructive testing of materials with infrared thermography. Infrared thermography may be performed after CT and in region(s) R identified in CT scan 36. Infrared thermography (also referenced herein as "thermography") uses a thermography measurement of a thermal response of a material during and/or shortly after mechanical excitation of the material. The mechanical excitation of component 12 may be provided using transducer 40, which may be an acoustic probe (e.g., ultrasonic horn) acoustically coupled to component 12, and/or a (e.g., hydraulic, pneumatic or electric) actuator drivingly coupled to component 12. Transducer 40 may be configured to convert energy in one form to energy in another form. In some embodiments, the excitation of component 12 may be provided electromagnetically. In various embodiments, the excitation may be delivered to component 12 using contact or non-contact methods. In some embodiments, the excitation of component 12 may be provided mechanically using transducer 40.

When using mechanical excitation of component 12, transducer 40 may induce a vibration into component 12. Transducer 40 may be operable in a controlled manner to input a vibration represented as a cyclic excitation F(t) (i.e., as a function of time) into component 12. In some embodiments, transducer 40 may include an actuator controlled (e.g., driven) by excitation driver 42 (e.g., controller), which may optionally be operatively connected to computer 34B. Excitation driver 42 may operate independently of computer 34B or may operate under the control/supervision of computer 34B. In some embodiments, excitation driver 42 and computer 34B may be in data communication with each other so that parameters (e.g., amplitude, frequency) of the excitation may be communicated from computer 34B to excitation driver 42 and/or from excitation driver 42 to computer 34B. The excitation delivered to component 12 may be uniform over the duration of the test, or may have one or more parameters that vary as a function of time. The excitation delivered to component 12 may be adjustable.

The mechanical excitation of component 12 or part thereof (e.g., in region R) may induce heat to be generated inside the material of component 12. For example, the presence of defect 22 may cause more heat to be generated in the vicinity of defect 22 compared to other regions devoid of defect 22 because the cyclic straining of the material may cause surfaces of defect 22 to rub together. In other words, adjacent and/or opposing surfaces of defect 22 may slide against each other and frictional heating may occur at a sliding interface of defect 22.

The excitation of component 12 may cause the material of component 12 to exhibit a thermal response that may be measured with one or more infrared (IR) detectors such as IR sensors 44 (referred hereinafter in the singular) by way of one or more digital thermographic images 46 (referred hereinafter in the singular). Since the part of component 12 containing defect 22 will generate more heat than other parts of component 12 that are devoid of defect 22, the thermal response will show an area of higher temperature that indicates the location and optionally also the type and severity of defect 22 within thermographic image 46. In some embodiments, the application of the excitation may be synchronized with the acquisition of thermographic image 46. In various embodiments, thermographic image 46 may be captured while the thermal response in the form of a temperature gradient indicative of defect 22 is being exhibited in component 12.

IR sensor 44 may be part of a suitable thermographic camera (also called an infrared camera or thermal imaging camera, thermal camera or thermal imager). IR sensor 44 may be operable to create digital thermographic image 46 using IR radiation, in a similar manner as a camera that forms an image using visible light. In some embodiments, IR sensor 44 may be sensitive to wavelengths from about 1,000 nm (1 micrometre or μm) to about 14,000 nm (14 μm).

The evaluation of component 12 may be conducted while component 12 is not currently being used in power plant 10. For example, the evaluation of component 12 may be conducted while component 12 is uninstalled from power plant 10 and held in fixture 32 outside of power plant 10. Alternatively, the evaluation of component 12 may be conducted while component 12 is installed in power plant 10 and power plant 10 is not in operation. In various embodiments, the mechanical excitation applied to component 12 may not be representative of an expected in-use operating condition of component 12. In other words, the applied mechanical excitation may be different from an expected in-use condition experienced by component 12 during the operation of power plant 10.

Computer 34B may be operatively connected to (e.g., in data communication with) one or more elements of thermography system 38 to control an operation of thermography system 38. Computer 34B may be in data communication with IR sensor 44 to receive data forming digital thermographic image 46. Using thermographic image 46 and optionally other data, computer 34B may be operable to generate one or more outputs indicative of one or more health conditions 48 (referred hereinafter in the singular) of component 12. In some embodiments, health condition 48 may be determined according to the teachings provided in U.S. patent application Ser. No. 18/821,005 (Title: SYSTEM AND METHOD FOR EVALUATING COMPONENTS USING THERMOGRAPHY) filed on Aug. 30, 2024 and incorporated herein by reference.

The impact of defect 22 on health condition 48 of component 12 may depend on one or more factors such as the type and geometry of component 12, the location of defect 22 on component 12, and other characteristics (e.g., type, severity) of defect 22. Component 12 may include a plurality regions R within which one or more defects 22 may be located. For example, when component 12 is a rotor (e.g., compressor or turbine) blade as shown in FIG. 2B, and defect 22 is closer to a root of the rotor blade, the remaining service life may be a first (e.g., lower) remaining service life. However, when the location of defect 22 is closer to a tip of the rotor blade, the remaining service life may be a second (e.g., higher) remaining service life different from the first remaining service life. In other words, a defect 22 in a more defect-sensitive location on component 12 may have a different impact on health condition 48 than an identical defect 22 at another less defect-sensitive location on component 12.

FIG. 2C is a schematic illustration of a combined inspection system 50 (referred hereinafter as "combined system 50") combining CT system 24 and thermography system 38. In some embodiments, CT system 24 and thermography system 38 may be separate systems so that component 12 may be installed in CT system 24 for undergoing CT, uninstalled from CT system 24 and then installed in thermography system 38 for undergoing infrared thermography. Alternatively, both CT system 24 and thermography system 38 may be combined/integrated together for a high throughput production environment requiring only one single installation of component 12 that serves for both the CT and the infrared thermography processes. For example, component 12 may remain installed in the same fixture 32 for both the CT and the infrared thermography processes. In a high-throughput environment, combined system 50 may accommodate a plurality of components 12 in a tray for example and automatically or semi-automatically evaluate the plurality of components 12 sequentially for example.

Combined system 50 may include both computers 34A and 34B or may include only one computer 34 that performs the CT and thermography functionalities of computers 34A and 34B. To facilitate CT functionality, combined system 50 may include X-ray source 26 and X-ray detector 28. X-ray source 26 and/or X-ray detector 28 may be movably or fixedly mounted to a common chassis 52 of combined system 50. Computer 34 may be operatively connected to (e.g., in data communication with) X-ray source 26 and X-ray detector 28 to control the operation of X-ray source 26 and X-ray detector 28 and also acquire CT scan 36 (shown in FIG. 2A). Computer 34 may be operatively connected to control a relative position between component 12 and X-ray source 26 and X-ray detector 28 by controlling a movement (e.g., rotation and/or translation) of component 12 and/or controlling a movement (e.g., rotation and/or translation) of X-ray source 26 and X-ray detector 28. Computer 34 may be configured to identify region(s) R of interest based on CT scan 36 as described below.

To facilitate thermography functionality, combined system 50 may include transducer 40, excitation driver 42 and IR sensor 44. Transducer 40, excitation driver 42 and/or IR sensor 44 may be movably or fixedly mounted to a common chassis 52 of combined system 50. Computer 34 may be operatively connected to (e.g., in data communication with) excitation driver 42 and IR sensor 44 to control the operation of excitation driver 42 and IR sensor 44, and also acquire thermographic image 46 (shown in FIG. 2B). Computer 34 may be operatively connected to control a relative position between component 12 and IR sensor 44 by controlling a movement (e.g., rotation and/or translation) of component 12 and/or controlling a movement (e.g., rotation and/or translation) of IR sensor 44 to bring region(s) R of component 12 within the field of view of IR sensor 44. Computer 34 may be configured to process thermographic image 46 and determine health condition 48 of component 12 based on thermographic image 46.

Component 12 may be held by fixture 32, which may be controllably movable relative to the X-ray source 26, X-ray detector 28 and/or IR sensor 44. In some embodiments, fixture 32 and component 12 may be translatable and/or rotatable to permit alignment with X-ray source 26 in preparation for CT. Component 12 may be rotated about rotation axis RA during the acquisition of CT scan 36. Once region(s) R has/have been identified, fixture 32 and component 12 may be translated and/or rotated to permit alignment of region(s) R with IR sensor 44 in preparation for thermography.

Figure 3:
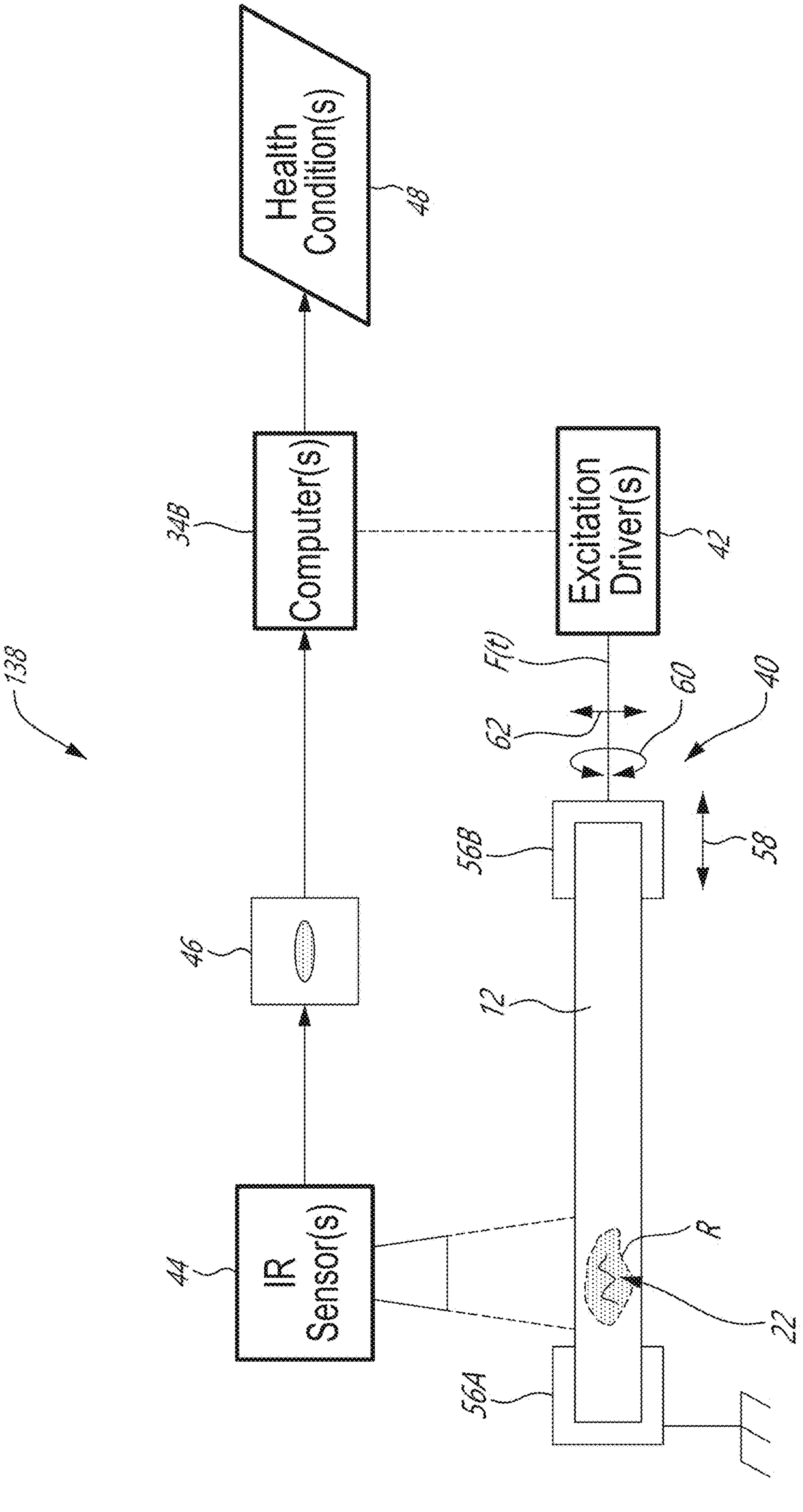
FIG. 3 is a schematic illustration of another exemplary infrared thermography system for evaluating a component of the aircraft power plant.

FIG. 3 is a schematic illustration of another exemplary thermography system 138 for evaluating component 12 of aircraft power plant 10. Thermography system 138 may be incorporated into combined system 50 as an alternative to thermography system 38. Thermography system 138 may include elements of thermography system 38 and like elements are identified using like reference numerals. Similarly to thermography system 38, thermography system 138 may be operable to determine one or more health conditions 48 of component 12 using infrared non-destructive testing of materials with thermography. The excitation of component 12 may be provided by mechanical loading using transducer 40. Transducer 40 may be configured to apply repeated tensile, compressive, bending and/or torsional loading on component 12. Transducer 40 may include stationary clamp 56A engageable with a first portion of component 12, and actuated (movable) clamp 56B engageable with a second portion of component 12. Actuated clamp 56B may be drivingly connected to an actuator controlled (e.g., driven) by excitation driver 42, which may optionally be operatively connected to computer 34B. Excitation driver 42 may operate independently of computer 34B or may operate under the control/supervision of computer 34B. In some embodiments, excitation driver 42 and computer 34B may be in data communication with each other so that parameters (e.g., amplitude, frequency) of the excitation may be communicated from computer 34B to excitation driver 42 or from excitation driver 42 to computer 34B. The excitation delivered to component 12 may be constant over time or may have one or more parameters that vary as a function of time. The excitation delivered to component 12 may be adjustable. Transducer 40 may be operable in a controlled manner to input cyclic loading F(t) (i.e., as a function of time) into component 12. In some embodiments, transducer 40 may be part of a (e.g., servo-hydraulic) mechanical (e.g., fatigue) testing system.

In some embodiments, actuatable clamp 56B may be actuatable in a reciprocating linear manner along arrow 58 to apply tensile (i.e., stretching) and/or compressive loading to component 12. In some embodiments, actuatable clamp 56B may, alternatively or in addition, be actuatable in a reciprocating rotary manner along arrow 60 to apply torsional loading to component 12. In some embodiments, actuatable clamp 56B may, alternatively or in addition, be actuatable in a reciprocating manner along arrow 62 to apply bending loading to component 12. The mechanical loading applied via actuatable clamp 56B may be applied in a manner that is not intended to (e.g., further) damage component 12 during the test. Accordingly, system 138 may be used to conduct NDT on component 12.

Computer 34B may be in data communication with IR sensor 44 to receive digital thermographic image 46 acquired while the mechanical excitation is being applied to component 12 using transducer 40. Using thermographic image 46 and optionally other data, computer 34B may be operable to generate one or more outputs indicative of one or more health conditions 48 of component 12.

Figure 4:
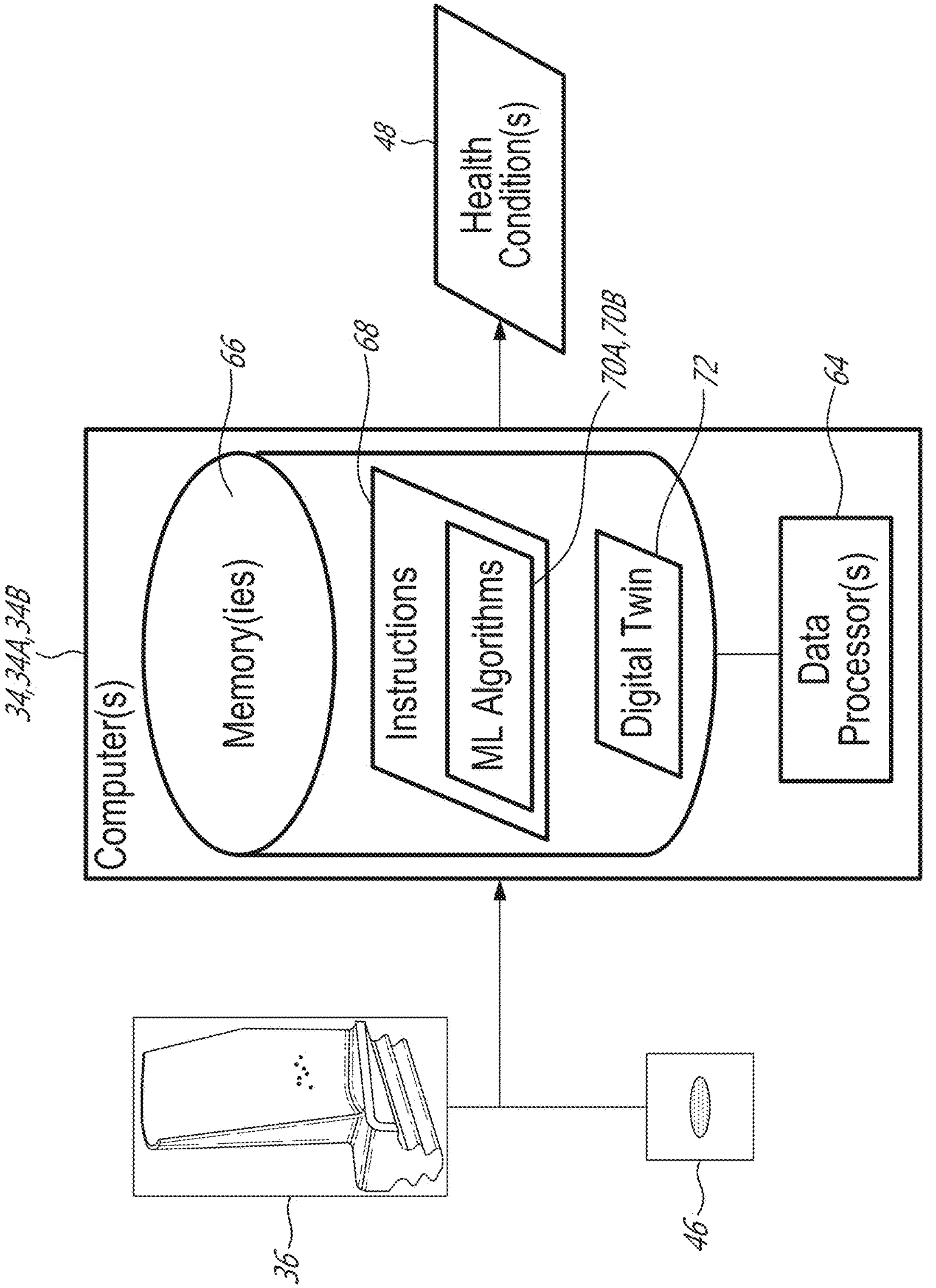
FIG. 4 is a schematic illustration of an exemplary computer of the combined system of FIG. 2C.

FIG. 4 is a schematic illustration of an exemplary computer 34, 34A, 34B (referred generally hereinafter as "computer 34") of combined system 50 of FIG. 2C. Computer 34 may be part of a specialized controller or other suitable hardware. Computer 34 may include one or more data processors 64 (referred hereinafter in the singular as "processor 64") and non-transitory machine-readable memory(ies) 66 (referred hereinafter in the singular). Computer 34 may be configured to generate an output (i.e., data) indicative of one or more health conditions 48 based on CT scan 36 and thermographic image 46 received, and optionally also perform other tasks. Computer 34 may perform one or more procedures or steps defined by instructions 68 (e.g., software, program code) stored in memory 66 and executable by processor(s) 64 to generate health condition(s) 48. Health condition(s) 48 may include an estimated remaining service life of component 12 and may be provided to an operator of combined system 50 or other maintenance personnel via a display device for example. The remaining service life may be quantified as a number of loading/unloading cycles, a number of flights/missions, a number of hours of operation of power plant 10, or as a fraction (e.g., percentage) of a nominal (e.g., baseline, average, expected) service life of component 12. For example, the nominal service life may be an expected service life of a version of component 12 that is devoid of defects that are outside an acceptable tolerance. Health condition 48 may include an identification of a service category from a limited set of possible service categories such as "acceptable", "needs rework" and "rejected", for example.

Processor(s) 64 may include any suitable device(s) configured to cause a series of steps to be performed by computer 34 so as to implement a computer-implemented process such that instructions 68, when executed by computer 34 or other programmable apparatus, may cause the functions/acts specified in the methods described herein to be executed. Processor(s) 64 may include, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 66 may include any suitable machine-readable storage medium. Memory 66 may include non-transitory computer-readable storage medium such as, for example, but not limited to, an electronic, magnetic, optical, electromagnetic, infrared, or semiconductor system, apparatus, or device, or any suitable combination of the foregoing. Memory 66 may include any storage means (e.g., devices) suitable for retrievably storing machine-readable instructions 68 executable by processor(s) 64. In some embodiments, machine-readable instructions 68 may include one or more computer-implemented trained digital models such as ML algorithms 70A, 70B also stored in memory 66. First ML algorithm 70A may be trained using ML on historical data identifying previous regions containing one or more defects in previous CT scans 36. Second ML algorithm 70B may be trained using ML and historical data associating previous thermographic images with previous health conditions relevant to component 12. ML algorithm(s) 70A, 70B may be one or more suitable artificial intelligence models. In some embodiments, ML algorithm(s) 70A, 70B may each include a trained artificial neural network (ANN) as explained below. Instructions 68 may be executable by processor 64 and configured to cause processor 64 to use ML algorithm(s) 70A, 70B, one or more new CT scans 36 and one or more new thermographic images 46 to determine health condition 48 of component 12.

In some embodiments, digital twin 72 of component 12 may optionally be stored in memory 66 and used by computer 34 to validate health condition 48 that is determined through the use of ML algorithm(s) 70A, 70B. Digital twin 72 may be a digital model of component 12 that serves as a substantially equivalent digital counterpart of component 12 for practical purposes, such as simulation, lifing, integration, testing, monitoring and/or maintenance. For example, digital twin 72 may be configured for stress modeling and material modeling based on one or more characteristics of defect 22. Digital twin 72 may simulate defect(s) 22 in component 12 and simulate the evolution of defect(s) 22 over time under different parameters such as temperature, flight hours, mechanical stresses, etc. Digital twin 72 may help determine which parameters are playing a major role in the evolution of defect(s) 22. Digital twin 72 may help predict the remaining service life of component 12 under different environmental and/or operating conditions. For example, digital twin 72 may simulate custom lifting models based on specific utilizations of power plant 10.

Digital twin 72 may be used to validate a remaining service life or other health condition 48 that is determined through the use of ML algorithm(s) 70A, 70B. For example, a first health condition determined through the use of ML algorithm(s) 70A, 70B may be compared with a second health condition that is independently determined using digital twin 72. Validation may be achieved when the first health condition substantially matches the second health condition. For example, when a first remaining service life determined with ML algorithm(s) 70A, 70B is within a prescribed range (i.e., tolerance) of a second service life determined with digital twin 72, then the first remaining service life may be validated (i.e., confirmed) with digital twin 72.

Figure 5A:
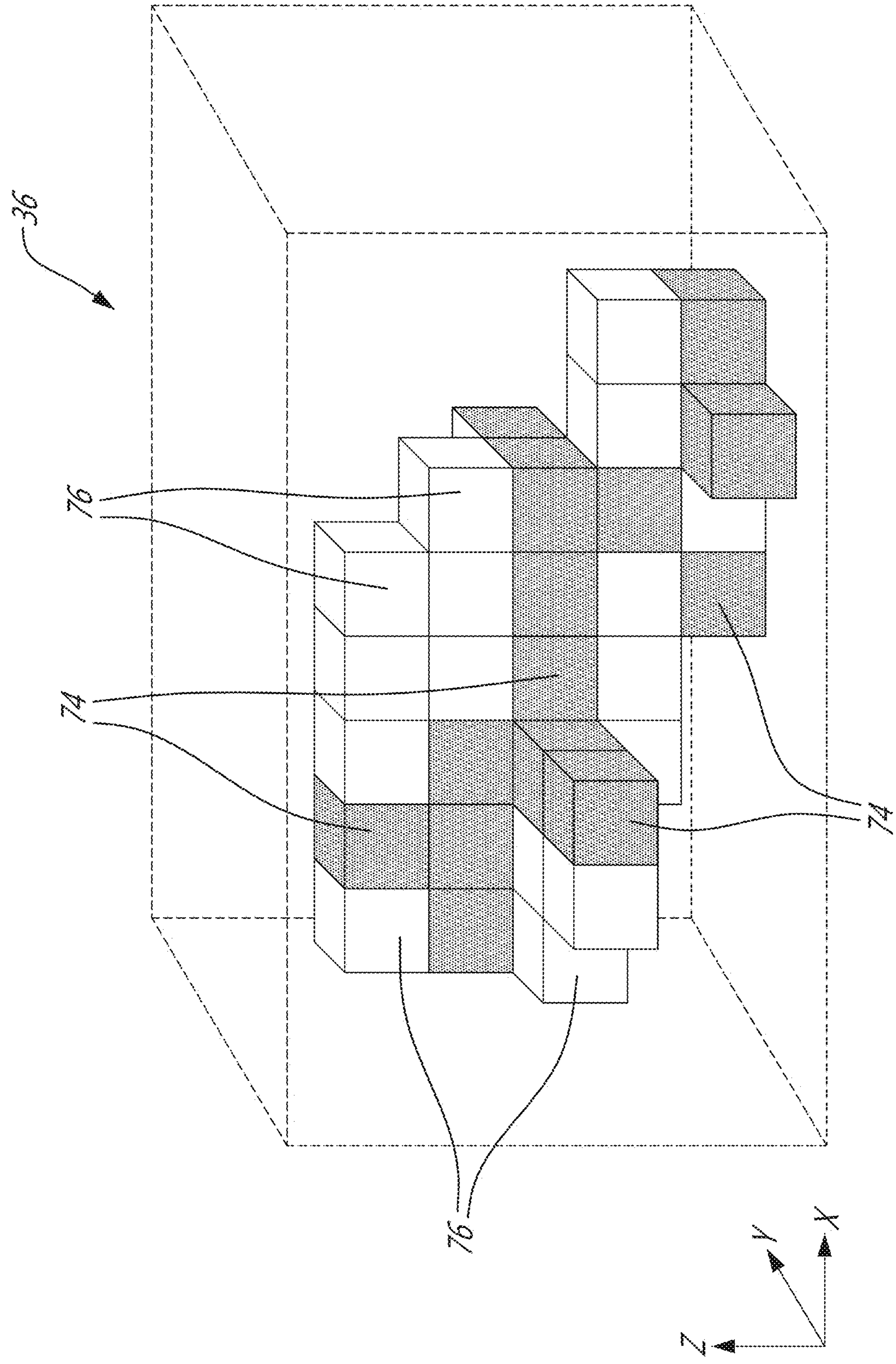
FIG. 5A is a schematic representation of a magnified portion of part of a computed tomography scan acquired with the system of FIG. 2A and/or the system of FIG. 2C.

FIG. 5A is a schematic representation of a magnified portion of CT scan 36 acquired with CT system 24 and/or with combined system 50. CT scan 36 may be a digital representation of component 12 in the form of a volume of voxels. CT scan 36 or part thereof may be rendered in 2-dimensional image(s) and/or viewed on a 2-dimensional display. As X-rays 30 pass through component 12, they are attenuated differently by the material of component 12 according to material density. Artifacts (i.e., material defects) exhibited in CT scan 36 may be caused by transitions between low- and high-density materials within component 12. Such artifacts may be identified using voxels having different values. For example, artifacts may be visually identified using voxels of different colors or of different grayscale shades. As an example, FIG. 5A shows dark voxels 74 and light voxels 76 within CT scan 36. Dark voxels 74 may indicate an unexpected low-density material or empty space within the selected volumetric region of CT scan 36. Dark voxels 74 may indicate the presence of a potential defect 22 such as one or more voids or cracks for example. CT scan 36 may have voxels of additional shades and/or colors to illustrate density gradients. The location of CT scan 36 relative to the geometry of component 12 may be known so that the location of dark voxels 74 within component 12 may be determined and optionally used to identify region(s) R of interest. When analyzing CT scan 36, computer 34, through the use of ML algorithm(s) 70A or other (e.g., deterministic, heat/density map) algorithm(s), may evaluate the values of the voxels 74, 76 in CT scan 36 to identify region(s) R. In some embodiments, ML algorithm (s) 70A may use image post-processing to establish identify region(s) R by analyzing variations in voxels 74, 76.

In some embodiments, region(s) R may be (e.g., 2-dimensional) flat or curved regions that is/are projected onto a nearest outer surface of component 12 to facilitate the subsequent orienting of IR sensor 44 if necessary for thermography. Alternatively, region(s) R may be one or more 3D (i.e., volumetric) regions that envelop a cluster of dark voxels 74 and IR sensor 44 may be oriented toward the 3D regions within (e.g., below the surface of) component 12 if necessary for thermography.

Figure 5B:
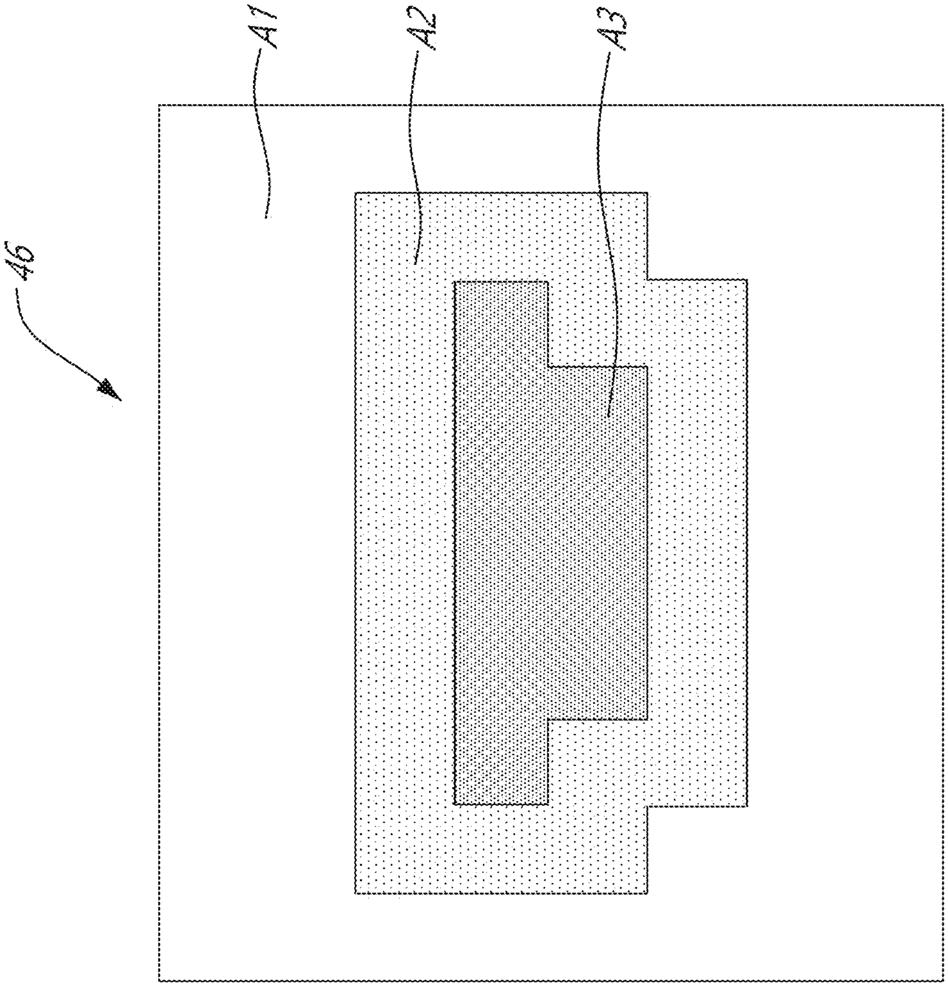
FIG. 5B is a schematic representation of a magnified portion of part of a thermographic image acquired with the system of FIG. 2B, the system of FIG. 2C and/or the system of FIG. 3.

FIG. 5B is a schematic representation of a magnified portion of digital thermographic image 46 acquired with thermography system 38, 138 and/or with combined system 50. Thermographic image 46 may also be referred to as a thermal image or a thermogram and may provide a visual display of the amount of infrared energy emitted, transmitted, and reflected by an object. Accordingly, areas of different colors or shades within thermographic image 46 may represent areas of different temperatures on component 12. The representation of thermographic image 46 shown in FIG. 5B shows pixels of different shades (i.e., values) in grayscale to represent different colors in thermographic image 46. Pixels in first area A1 have a lighter shade to represent a lower temperature. Pixels in third area A3 have a darker shade to represent a higher temperature corresponding to the location of defect 22, which may be internal and below an outer surface of component 12. Pixels in second area A2 have an intermediate shade to represent a temperature that is between those of first area A1 and third area A3. Thermographic image 46 may have additional shades and/or colors to illustrate temperature gradients. The location of thermographic image 46 relative to the geometry of component 12 may be known so that the location of defect 22 on component 12 may be determined and optionally used to determine health condition 48.

When analyzing thermographic image 46, computer 34, through the use of ML algorithm(s) 70B or other (e.g., deterministic) algorithm, may evaluate the values of the pixels in thermographic image 46. ML algorithm(s) 70B may use image post-processing to establish a thermographic map which may allow to identify defect 22 by analyzing thermal variations. For example, computer 34 may use the values of the pixels to extract thermographic features from thermographic image 46 and assess one or more characteristics of defect 22. Thermographic features may include: a relative percentage of the total area A that is covered by defect 22 (e.g., the fraction of area A1 over the total area A1+A2+A3); dimensions (e.g., length, width) of second area A2 and/or of third A3; the shape of second area A2 and/or of third A3; the location of defect 22 on component 12 (e.g., whether defect 22 is proximate to an edge, to a blade root or to a blade tip); the thermal diffusivity of defect 22 by considering the transient and steady state responses to the excitation; and/or the population density of defect(s) 22. Computer 34 may also consider a probability of detection and/or confidence interval in detecting certain types of defects with the experimental setup and parameters that are being used.

As explained further below, computer 34 may, in some embodiments, determine health condition 48 directly from thermographic image 46. In some embodiments, computer 34 may first relate/associate thermographic image 46 to one or more characteristics of defect 22 and then relate/associate the characteristic(s) of defect 22 to health condition 48.

FIG. 6 is a flow diagram of an exemplary method 1000 of evaluating component 12 or another component containing one or more defects 22 using non-destructive inspection. Method 1000 may be performed using systems 24, 38, 138, combined system 50 and/or using another system. For example, machine-readable instructions 68 may be configured to cause computer 34 to perform at least part of method 1000. Method 1000 may include other actions disclosed herein. Method 1000 may include elements of systems 24, 38, 138 and/or of combined system 50. In various embodiments, method 1000 may include:

- acquiring, using X-ray CT, a digital 3D representation (e.g., CT scan 36) of component 12 (block 1002);
- identifying region(s) R of component 12 containing defect 22 from the digital 3D representation of component 12 (block 1004);
- mechanically exciting component 12 to induce a thermal response in region(s) R of component 12 containing defect 22 (block 1006);
- acquiring, with IR sensor 44 while the thermal response is exhibited, thermographic image(s) 46 of region(s) R of component 12 containing defect 22 (block 1008); and
- evaluating component 12 using thermographic image(s) 46 (block 1010).

The identification of region R of component 12 from CT scan 36 may be performed using a deterministic (e.g., ruled-based) algorithm or using first ML algorithm 70A. For example, method 1000 may include executing first ML algorithm 70A to read and process CT scan 36 and identify region R of component 12 containing defect 22. Method 1000 may include generating an output indicative of the identified region R of component 12 containing defect 22. The output may include a visual representation of region R superimposed on a surface of component 12 displayed on a display device, and optional dimensions locating region R from a point of reference on physical component 12 or a point of reference on fixture 32. In an automated system, such visual representation may not be required and the region R may be stored in memory 66 and used by combined system 50 to subsequently perform thermography. As explained further below, first ML algorithm 70A may have been trained using ML on historical data identifying previous regions containing one or more defects in previous digital 3D representations (i.e., CT scans) acquired using X-ray CT.

The evaluation of component 12 using thermographic image 46 may be performed using a deterministic (e.g., ruled-based) algorithm or using second ML algorithm 70B. Evaluating component 12 may include determining health condition 48 of component 12. Second ML algorithm 70B may have been trained using ML on historical data associating previous thermographic images with previous health conditions relevant to component 12. In some embodiments of method 1000, mechanically exciting component 12 may include inducing heat generation within component 12. For example, mechanically exciting component 12 may include inducing a vibration in component 12. Mechanically exciting component 12 may include applying a mechanical excitation to component 12 to induce frictional heating at the location of defect 22.

In some embodiments, using second ML algorithm 70B, determining the remaining service life of component 12 may be based on the location of defect 22 on component 12. For example, for rotor blade of power plant 10, when the location of defect 22 is closer to a root of the rotor blade than to a tip of the rotor blade, the remaining service life may be a first remaining service life. However, when the location of defect 22 is closer to a tip of the rotor blade than to a root of the rotor blade, the remaining service life may be a second remaining service life different from the first remaining service life. In some embodiments, determining the remaining service life of component 12 may be based on a parameter (e.g., frequency, magnitude, type) of a mechanical excitation used to heat component 12.

In some embodiments, determining the remaining service life of component 12 may be done in one step directly from thermographic image 46. Alternatively, determining the remaining service life of component 12 may be done in two or more steps using thermographic image 46. For example, method 1000 may include identifying a characteristic of defect 22 based on thermographic image 46; and then relating the characteristic of defect 22 to health condition 48.

Thermographic image 46 and/or characteristic(s) of defect 22 may be compared to one or more predefined (e.g., thermal) signatures, thresholds (e.g., from calibration reference standards), guidelines and/or ranges to determine the appropriate health condition 48. Such signatures, thresholds, guidelines and/or ranges may be predetermined and stored in memory 66. In some embodiments, such signatures, thresholds, guidelines and/or ranges may be stored/represented in second ML algorithm(s) 70B and determined from historical data that has been used to train second ML algorithm(s) 70B.

Method 1000 may include validating health condition 48 that is determined using second ML algorithm 70B using digital twin 72. For example, method 1000 may include identifying a characteristic of defect 22 in component 12 based on thermographic image 46. Before generating an output indicative of health condition 48, method may include determining a second health condition of component 12 using the characteristic of defect 22 and digital twin 72 of component 21; and validating health condition 48 by comparing health condition 48 with the second health condition.

In some automated embodiments, such as when combined system 50 is being used, method 1000 may include acquiring CT scan 36 and acquiring thermographic image 46 while component 12 remains in the same fixture 32.

Further aspects of method 1000 are described below in relation to the subsequent figures.

Figure 7:
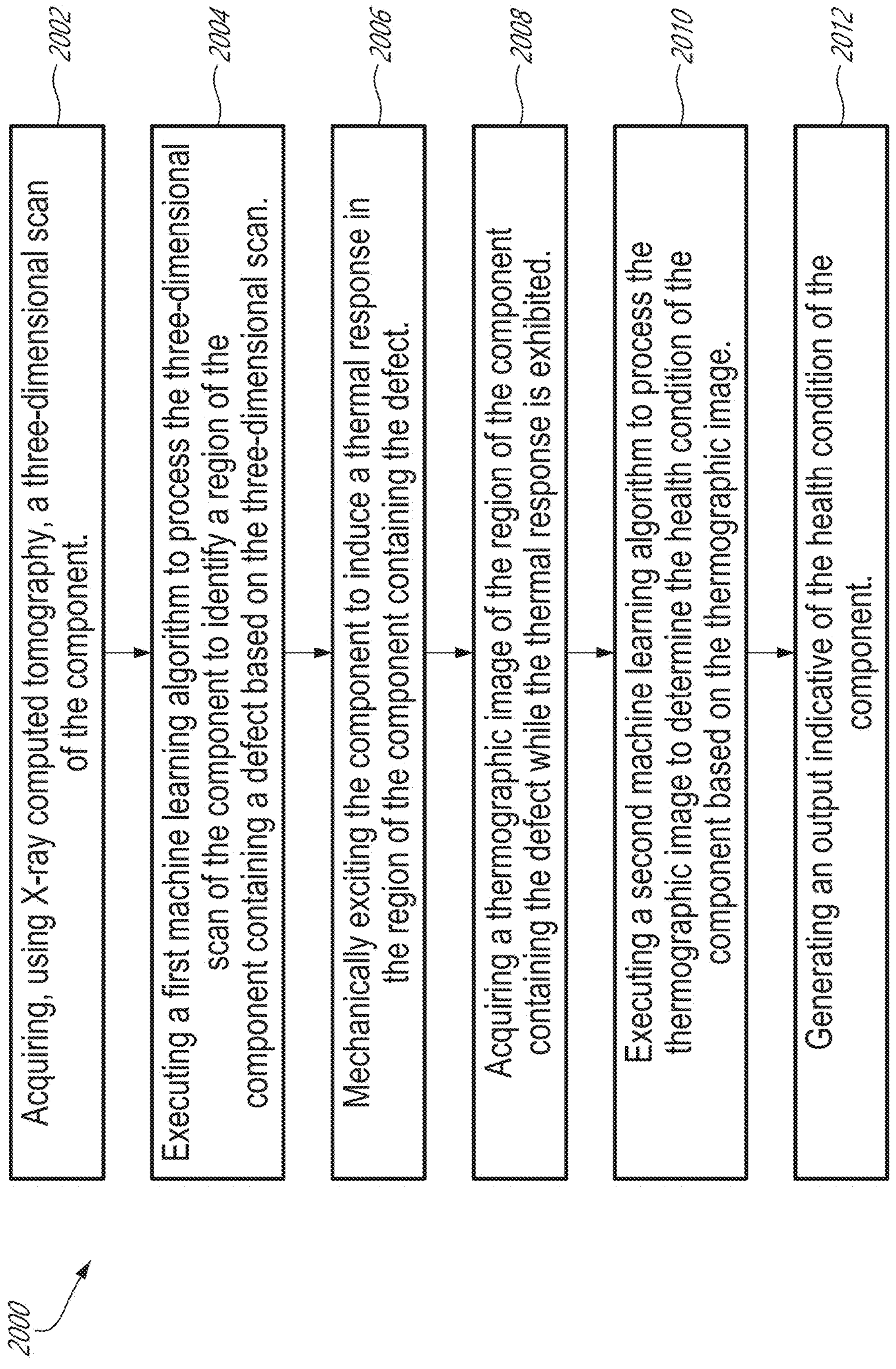
FIG. 7 is a flow diagram of an exemplary method of determining a health condition of a component using X-ray computed tomography and infrared thermography.
Figure 9:
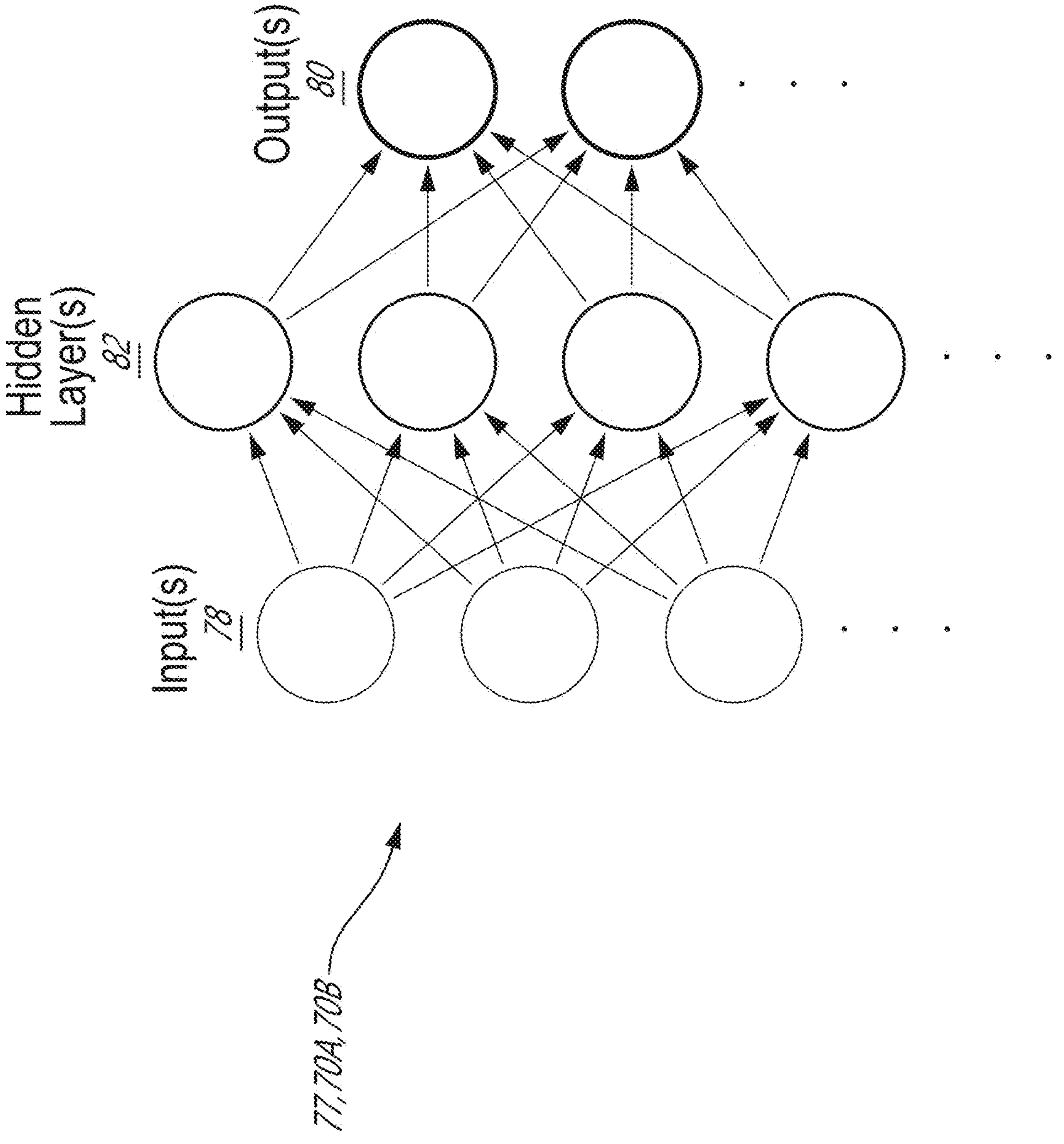

FIG. 7 is a flow diagram of an exemplary method 2000 of determining health condition 48 of component 12 using X-ray CT and infrared thermography. Method 2000 may include some or all of method 1000. Method 2000 may be performed using systems 24, 38, 138, combined system 50 and/or using another system. For example, machine-readable instructions 68 may be configured to cause computer 34 to perform at least part of method 2000. Method 2000 may include elements of systems 24, 38, 138 and/or of combined system 50. In various embodiments, method 2000 may include:

- acquiring, using X-ray CT, a 3D scan (e.g., CT scan 36) of component 12 (block 2002);
- executing first ML algorithm 70A to process the 3D scan of component 12 to identify region(s) R of component 12 containing defect 22 based on the 3D scan (block 2004);
- mechanically exciting component 12 to induce a thermal response in region(s) R of component 12 containing defect 22 (block 2006);
- acquiring thermographic image(s) 46 of region(s) R of component 12 containing defect 22 while the thermal response is exhibited (block 2008);
- executing second ML algorithm 70B to process thermographic image(s) 46 to determine health condition 48 of component 12 based on thermographic image(s) 46 (block 2010); and
- generating an output indicative of health condition 48 of component 12 (block 2012).

In some embodiments of method 2000, first ML algorithm 70A may have been trained using ML on historical data identifying previous regions containing one or more defects in previous 3D scans (e.g., CT scans) acquired using X-ray CT.

In some embodiments of method 2000, second ML algorithm 70B may have been trained using ML on historical data associating previous thermographic images with previous health conditions relevant to the component.

In some embodiments of method 2000, mechanically exciting component 12 may include acoustically exciting component 12.

In some automated embodiments, such as when combined system 50 is being used, method 2000 may include acquiring CT scan 36 and acquiring thermographic image 46 while component 12 remains in the same fixture 32.

In various embodiments of methods 1000 and 2000, health condition 48 may be indicative of whether the estimated remaining service life of component 12 is sufficient for component 12 to be installed (e.g., fastened) in power plant 10. Health condition 48 may include a quantification of an estimated remaining service life for component 12 and/or may include a service category for component 12. For example, if the remaining service life is determined not to be significantly reduced by defect 22, health condition 48 may be set to the “acceptable” service category (i.e., conforming to applicable quality standard(s)) so that component 12 may be installed into power plant 10 and used during operation of power plant 10. In situations where the remaining service life of component 12 is determined to be unsuitable for service but may be improved by way of repair, health condition 48 may be set to the “needs rework” service category to indicate that component 12 may be repaired to improve its service life. In some situations, repairing component 12 may include replacing a portion of component 12 containing defect 22 with new material. In situations where the remaining service life of component 12 is determined to be unsuitable for service and a characteristic of defect 22 indicates that defect 22 is beyond repair, health condition 48 may be set to the “rejected” service category (i.e., not conforming to applicable quality standard(s)) so that component 12 may not be installed in power plant 10. When health condition 48 is set to the “rejected” service category, component 12 may be discarded or recycled.

In various embodiments, methods 1000 and 2000 may include training first ML algorithm 70A and/or second ML algorithm 70B using a suitable ML training algorithm and historical data.

Further aspects of method 2000 are described below in relation to the subsequent figures.

FIG. 8 is a flow diagram of another exemplary method 3000 of evaluating component 12 using non-destructive inspection (e.g., thermography). Method 3000 may include some or all of methods 1000 and/or 2000. Method 3000 may be performed using systems 24, 38, 138, combined system 50 and/or using another system. For example, machine-readable instructions 68 may be configured to cause computer 34 to perform at least part of method 3000. Method 3000 may include other actions disclosed herein. Method 3000 may include elements of systems 24, 38, 138 and/or of combined system 50. Method 3000 may include actions associated with the construction of first ML algorithm 70A and second ML algorithm 70B as well as actions associated with the use of first ML algorithm 70A and second ML algorithm 70B.

At block 3002, method 3000 may include the acquisition of CT scans 36 of component 12 to undergo evaluation using infrared thermography. At block 3004, method 3000 may include the analysis of CT scans 36 to identify region R of interest containing defect 22. The analysis of CT scans 36 may be performed using first ML algorithm 70A. At block 3006, method 3000 may include the acquisition of thermographic images 46 of region R of component 12 using infrared thermography while the thermal response is exhibited in component 12. At block 3006, thermographic features may be extracted from thermographic images 46 either manually and/or using image analysis software such as second ML algorithm 70B. At block 3008, the extracted thermographic features may be compared to a reference database of thresholds and criteria to identify defect 22 in component 12. Block 3008 may include information that may be included in the reference database. Such information may include data acquired during product development and certification of component 12 (e.g., mechanical testing), field failure data from in-service components acquired at (e.g., hot section) inspection or overhauls of power plant 10, and/or in-service performance metrics such as time-on-wing, hours of operation, number of flight cycles, etc.

Following the comparison at block 3008, block 3010 may include an output of quantification and qualification of different types of defects that have been observed in the test components. At block 3014, the information from block 3010 may be used to train second ML algorithm 70B using correlations of the thermographic features with the service observations from block 3012. The service observations at block 3012 may also include one or more acceptance criteria applicable to component 12. The service observations may include CT scans and thermographic images for various components and types of defects, in-service metrics, field failure data, power plant (e.g., engine) data (e.g., real time parameters such as ambient or other temperatures and pressures collected by a controller of the power plant, testing and performance information), life estimates for components with specific defects determined through experimentation and/or modeling, power plant certification data such as spin pit information and test information for development power plants for example. The service observations may include component life reductions associated with different types of defects.

Once second ML algorithm 70B has been trained, second ML algorithm 70B may be used at block 3014 with thermographic image 46 of component 12 to determine health condition 48 (e.g., whether component 12 is acceptable for service and/or what is the remaining service life of component 12). Health condition 48 may be displayed to an operator of thermography system 38, 138 or of combined system 50 via a display device for example.

At block 3018, further thermographic inspections of component 12 may be performed at different times throughout the life of component 12 and additional in-service data may be generated from such subsequent inspections. The service observations at block 3012 may be used to initially train first ML algorithm 70A and/or second ML algorithm 70B. The service observations at block 3012 may be used to further train (i.e., refine) first ML algorithm 70A and/or second ML algorithm 70B so that the performance (e.g., accuracy) of first ML algorithm 70A and/or second ML algorithm 70B may be improved over time in an iterative manner through active learning as more service observations become available. The further training of first ML algorithm 70A and/or second ML algorithm 70B with the service observations may be performed periodically or continuously as additional service observations become available. The service observations may relate to components that are sufficiently related (e.g., identical and/or of the same type/family) to component 12 so that the information from the service observations may be applicable to component 12.

Further aspects of method 3000 are described below in relation to the subsequent figures.

Figure 9:
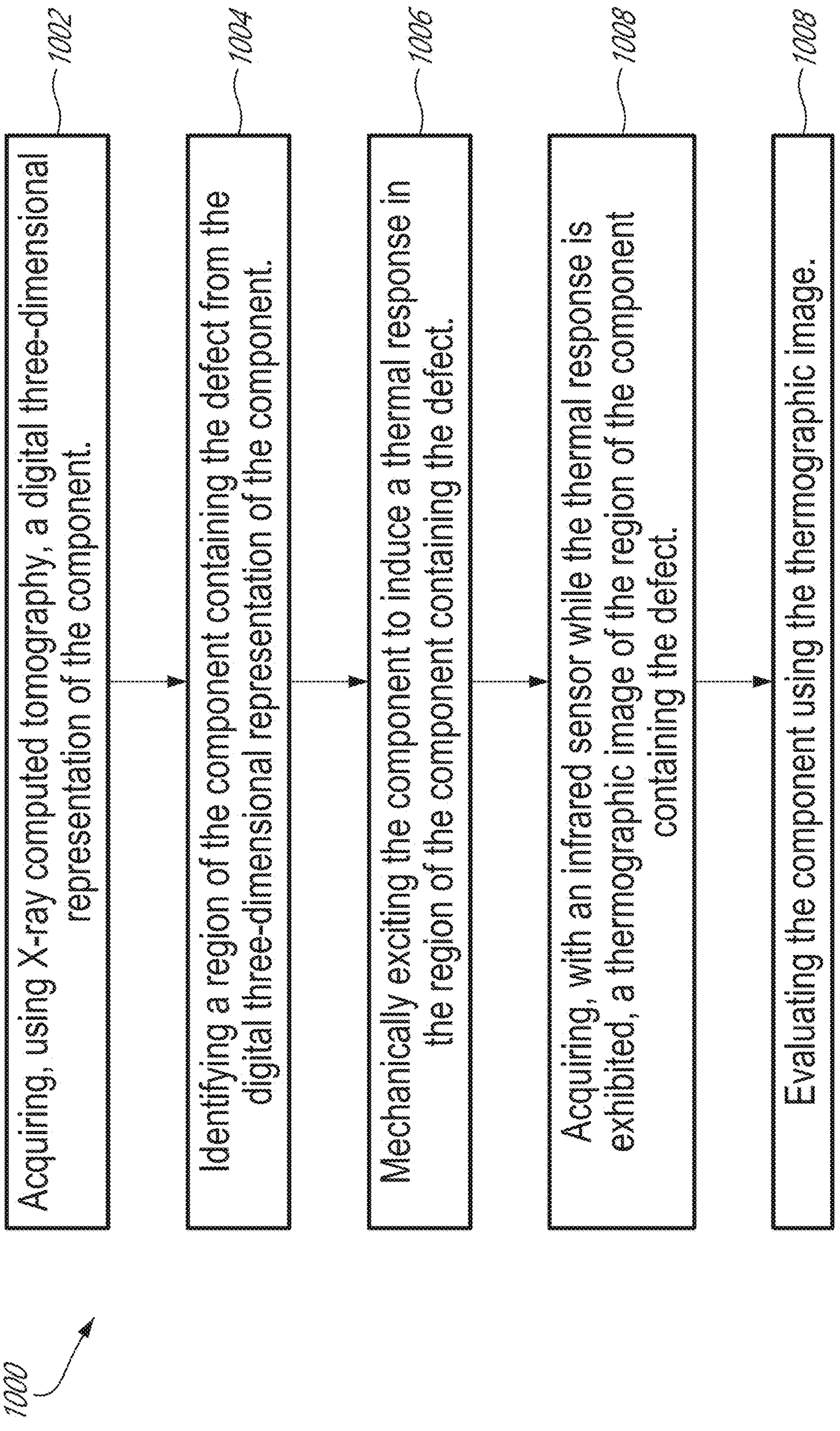
FIG. 9 is a schematic representation of an exemplary machine learning algorithm implemented as an artificial neural network.

FIG. 9 is a schematic representation of an exemplary architecture of an exemplary ANN 77 of any first ML algorithm 70A and/or second ML algorithm 70B. ANN 77 may include interconnected units or nodes called artificial neurons. The illustrated circular nodes represent artificial neurons and the arrows each represent a connection from the output of one artificial neuron to the input of another. Each artificial neuron receives signals from connected neurons, then processes them and sends a signal to other connected neurons. The signal may be a real number, and the output of each neuron may be computed by a function of the sum of its inputs, called an activation function. The strength of the signal at each connection is determined by a weight, which is adjusted iteratively during the learning process (i.e., training). ANN 77 may learn from experience and be trained using training data to derive (e.g., via statistical estimation) a suitable region R or a suitable health condition 48.

The artificial neurons of ANN 77 may be aggregated into layers. Different layers may perform different transformations on their inputs. Signals may travel from the input layer 78 (referred hereinafter as "input 78") to the output layer 80 (referred hereinafter as "output 80") by passing through one or more intermediate hidden layers 82. In some embodiments, ANN 77 may be a deep neural network having two or more hidden layers 82. One or more ANNs 77 may be used to identify region(s) R from CT scan 36 during operation of CT system 24 or of combined system 50. One or more ANNs 77 may also be used to relate thermographic image 46 to a corresponding health condition 48 during operation of thermography system 38, 138 or of combined system 50. In some embodiments, ANN(s) 77 may be a long short-term memory network. In some embodiments, ANN(s) 77 may be one or more convolutional neural networks (CNNs) suitable to perform analysis on CT scan 36 and/or on thermographic image 46. The CNNs may be feed-forward neural networks that learn features by itself via filter (or kernel) optimization.

Figure 10:
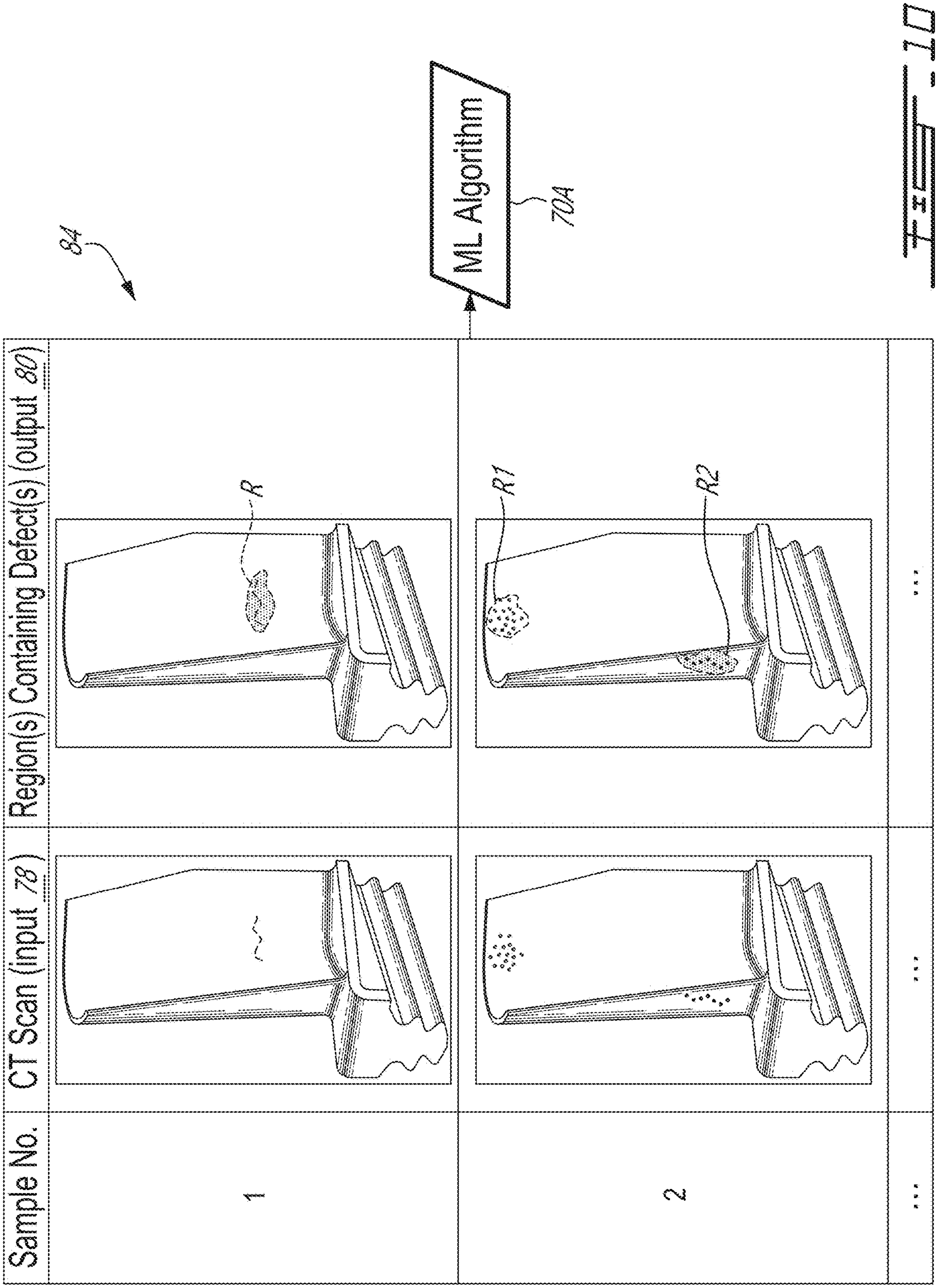
FIG. 10 shows a table containing exemplary historical data used to train a machine learning algorithm using machine learning for identifying a region of the component containing a defect based on a computed tomography scan.

FIG. 10 shows a table containing exemplary first historical labeled data 84 used as a ML dataset to train first ML algorithm 70A using ML for identifying region(s) R of component 12 containing defect(s) 22 based on CT scan 36 using a suitable ML training algorithm. First historical data 84 may be labeled by a human and stored in a database and training of first ML algorithm 70A may be performed with computer 34 or with another computer. First ML algorithm 70A may be trained to identify region(s) R, R1, R2 from previous CT scans of other related components as input 78 for ANN 77. Region(s) R may include regions having one or more artifacts (e.g., dark voxels 74) that are indicative of a defect of concern, as output 80 for ANN 77. Region(s) R may be identified based on prescribed threshold of size and/or number of artifacts in the CT scans. In some embodiments, first ML algorithm 70A may include one or more classifiers having an image analysis algorithm that automatically classifies structures (e.g., subsets) of CT scans as either being indicative of a defect or not indicative of a defect. In other words, first ML algorithm 70A may be trained to recognize patterns in CT scans that are indicative of defects of concern.

In some embodiments, first ML algorithm 70A may be trained to identify region R that contains the most severe defect(s) (e.g., a large unexpected cluster of dark voxels 74) out of component 12. In various embodiments, first ML algorithm 70A may be trained to identify region(s) R based on a fraction (e.g., percent) coverage of defect relative to a selected total area, a fraction of a component length or width that is covered by the defect(s), a size (e.g., length, width, and depth) of a defect, a location of a defect within component, an orientation of a defect, a defect's proximity to an edge of the component, a population density of the defects, a shape of the defect(s) and/or a type of defect(s).

FIG. 11 shows a table containing exemplary labeled second historical data 86 used as a ML dataset to train second ML algorithm 70B using a suitable ML training algorithm. Second historical data 86 may be labeled by a human and stored in a database and training of second ML algorithm 70B may be performed with computer 34 or with another computer. Second ML algorithm 70B may be trained to relate previous thermographic images as input 78 to ANN 77 directly to previous health conditions as output(s) 80 of ANN 77. The health condition(s) may include an estimate of the remaining service life of the component and/or a service category such as "acceptable", "needs rework" or "rejected" for example. The health condition(s) may include a defect characteristic, which may, for example, include a type of defect (e.g., crack, void, porosity), a size of the defect (e.g., specific dimension or relative term such as "small", "medium" or "large"), an orientation of an elongated defect such as a crack, void or microporosity (e.g., transverse or parallel to a loading axis), and/or a severity (e.g., relative term such as "low", "medium" or "high"). Second historical data 86 may be used to train ANN 77 in an iterative and supervised ML manner. In some embodiments, second ML algorithm 70B may include one or more classifiers having an algorithm that automatically orders or categorizes data into one or more of a set of classes such as a service category or a defect characteristic for example.

In some embodiments, second ML algorithm 70B may include a regression algorithm that automatically assigns a numerical value that is within a range. For example, in some embodiments, second ML algorithm 70B may be configured to relate thermographic image 46 and optionally other input(s) 78 to a specific value of the remaining service life. The specific value may be a number of loading/unloading cycles, a number of flights/missions, a number of hours of operation of power plant 10, or as a fraction (e.g., percentage) of a nominal (e.g., baseline, average, expected) service life of component 12.

The embodiments described in this document provide non-limiting examples of possible implementations of the present technology. Upon review of the present disclosure, a person of ordinary skill in the art will recognize that changes may be made to the embodiments described herein without departing from the scope of the present technology.

What is claimed is:

1. A method of evaluating a component containing a defect using non-destructive inspection, the method comprising:

acquiring, using X-ray computed tomography, a digital three-dimensional representation of the component;

identifying a region of the component containing the defect from the digital three-dimensional representation of the component;

mechanically exciting the component to induce a thermal response in the region of the component containing the defect;

acquiring, with an infrared sensor while the thermal response is exhibited, a thermographic image of the region of the component containing the defect; and evaluating the component using the thermographic image.

2. The method as defined in claim 1, wherein evaluating the component includes:

executing a machine learning algorithm to process the thermographic image and determine a remaining service life of the component based on the thermographic image; and generating an output indicative of the remaining service life of the component, wherein the machine learning algorithm has been trained using machine learning on historical data associating previous thermographic images with previous remaining service lives.

3. The method as defined in claim 2, wherein:

the remaining service life of the component is a first remaining service life of the component;

evaluating the component includes identifying a characteristic of the defect in the component based on the thermographic image;

the method includes, before generating the output indicative of the first remaining service life:

determining a second remaining service life of the component using the characteristic of the defect and a digital twin of the component; and validating the first remaining service life by comparing the first remaining service life with the second remaining service life.

4. The method as defined in claim 2, wherein:

the machine learning algorithm is a first machine learning algorithm; and identifying the region of the component containing the defect in the digital three-dimensional representation of the component includes:

executing a second machine learning algorithm to process the digital three-dimensional representation of the component and identify the region of the component containing the defect; and generating an output indicative of the identified region of the component containing the defect, wherein the machine learning algorithm has been trained using machine learning on historical data identifying previous regions containing one or more defects in previous digital three-dimensional representations acquired using X-ray computed tomography.

5. The method as defined in claim 1, wherein identifying a region of the component containing the defect in the digital three-dimensional representation of the component includes:

executing a machine learning algorithm to process the digital three-dimensional representation of the component and identify the region of the component containing the defect; and generating an output indicative of the identified region of the component containing the defect, wherein the machine learning algorithm has been trained using machine learning on historical data identifying previous regions containing one or more defects in previous digital three-dimensional representations acquired using X-ray computed tomography.

6. The method as defined in claim 1, wherein evaluating the component includes identifying a characteristic of the defect in the component based on the thermographic image.

7. The method as defined in claim 1, wherein evaluating the component includes identifying a health condition for the component based on the thermographic image.

8. The method as defined in claim 1, wherein mechanically exciting the component includes inducing frictional heating at the defect.

9. The method as defined in claim 1, wherein acquiring the digital three-dimensional representation of the component and acquiring the thermographic image are performed while the component remains in a same fixture.

10. A method of determining a health condition of a component using X-ray computed tomography and infrared thermography, the method comprising:

acquiring, using X-ray computed tomography, a three-dimensional scan of the component;

executing a first machine learning algorithm to process the three-dimensional scan of the component to identify a region of the component containing a defect based on the three-dimensional scan;

mechanically exciting the component to induce a thermal response in the region of the component containing the defect;

acquiring a thermographic image of the region of the component containing the defect while the thermal response is exhibited;

executing a second machine learning algorithm to process the thermographic image to determine the health condition of the component based on the thermographic image; and generating an output indicative of the health condition of the component.

11. The method as defined in claim 10, wherein the first machine learning algorithm has been trained using machine learning on historical data identifying previous regions containing one or more defects in previous three-dimensional scans acquired using X-ray computed tomography.

12. The method as defined in claim 11, wherein the second machine learning algorithm has been trained using machine learning on historical data associating previous thermographic images with previous health conditions.

13. The method as defined in claim 10, wherein mechanically exciting the component includes acoustically exciting the component.

14. The method as defined in claim 10, wherein acquiring the three-dimensional scan and acquiring the thermographic image are performed while the component remains in a same fixture.

15. A system for performing non-destructive inspection of a component, the system comprising:

a fixture configured to hold the component;

an X-ray source and an X-ray detector cooperatively operable to perform X-ray computed tomography of the component while the component is held by the fixture;

a transducer operable to induce a vibration in the component and generate a thermal response in a region of the component containing a defect while the component is held by the fixture; and an infrared sensor operable to acquire a thermographic image of the region of the component containing the defect while the thermal response is exhibited.

16. The system as defined in claim 15, comprising one or more computers operable to process a three-dimensional scan of the component acquired by the X-ray computed tomography and identify the region of the component containing the defect from the three-dimensional scan.

17. The system as defined in claim 16, wherein the one or more computers are operable to:

execute a machine learning algorithm to process the three-dimensional scan of the component and identify the region of the component containing the defect; and generate an output indicative of the identified region of the component containing the defect, wherein the machine learning algorithm has been trained using machine learning on historical data identifying previous regions containing one or more defects in previous digital three-dimensional representations acquired using X-ray computed tomography.

18. The system as defined in claim 17, wherein the one or more computers are operable to control a relative position between the infrared sensor and the component so that the thermographic image of the component acquired with the infrared sensor includes the region of the component containing the defect.

19. The system as defined in claim 17, wherein the one or more computers are operable to process the thermographic image and determine a health condition of the component based on the thermographic image.

20. The system as defined in claim 15, wherein the fixture is controllably movable relative to the X-ray source and relative to the infrared sensor.

* * * * *